US012594727B2

(12) United States Patent
Inanç et al.

(10) Patent No.: US 12,594,727 B2
(45) Date of Patent: Apr. 7, 2026

(54) EXTRUSION-BASED ADDITIVE MANUFACTURING: METHOD AND 3D PRINTING SYSTEM

(71) Applicant: DEMCON BOND 3D B.V., Enschede (NL)

(72) Inventors: Bahri Sinan Inanç, Enschede (NL); Tom Wimmenhove, Enschede (NL); Guus Kuiper, Enschede (NL)

(73) Assignee: Demcon Bond 3D B.V., Enschede (NL)

( * ) Notice: Subject to any disclaimer, the term of this patent is extended or adjusted under 35 U.S.C. 154(b) by 341 days.

(21) Appl. No.: 18/256,220

(22) PCT Filed: Dec. 16, 2021

(86) PCT No.: PCT/EP2021/086132
§ 371 (c)(1),
(2) Date: Jun. 7, 2023

(87) PCT Pub. No.: WO2022/129304
PCT Pub. Date: Jun. 23, 2022

(65) Prior Publication Data
US 2024/0017496 A1 Jan. 18, 2024

(30) Foreign Application Priority Data
Dec. 17, 2020 (EP) ................................... 20215082

(51) Int. Cl.
*B29C 64/393* (2017.01)
*B29C 64/106* (2017.01)
(Continued)

(52) U.S. Cl.
CPC .......... *B29C 64/393* (2017.08); *B29C 64/106* (2017.08); *B29C 64/182* (2017.08);
(Continued)

(58) Field of Classification Search
CPC ... B29C 64/393; B29C 64/106; B29C 64/182; B29C 64/386; B33Y 10/00; B33Y 30/00; B33Y 50/02; B33Y 50/00
(Continued)

(56) References Cited

U.S. PATENT DOCUMENTS

2016/0236414 A1 8/2016 Reese et al.
2018/0370114 A1 12/2018 Hopkins et al.
2020/0035015 A1* 1/2020 Courter .................. G06F 30/00

FOREIGN PATENT DOCUMENTS

WO 2008107866 A1 9/2008

* cited by examiner

*Primary Examiner* — Michael J Brown
(74) *Attorney, Agent, or Firm* — Hudak, Shunk & Farine Co. LPA

(57) ABSTRACT

A method for enabling an extrusion-based AM 3D printing system to handle individual 3D parts of a print job having at least two 3D parts. The method includes slicing the print job to generate a set of slices for the digital 3D representations of the 3D parts. Each slice having geometrical data defining boundaries of a layer of AM feedstock material for printing each 3D part taking into account said boundaries. Generating for each 3D part an individual set of geometrical data taking into account said geometrical data, wherein each individual set of geometrical data includes geometrical data defining the boundaries of the layers of AM feedstock material that are to be taken into account for printing the respective 3D part. An AM 3D printing system that is adapted to perform said method.

20 Claims, 10 Drawing Sheets

(51) Int. Cl.
| | |
|---|---|
| *B29C 64/182* | (2017.01) |
| *B33Y 10/00* | (2015.01) |
| *B29C 64/386* | (2017.01) |
| *B33Y 30/00* | (2015.01) |
| *B33Y 50/00* | (2015.01) |
| *B33Y 50/02* | (2015.01) |

(52) U.S. Cl.
CPC ............... *B33Y 10/00* (2014.12); *B33Y 30/00* (2014.12); *B33Y 50/02* (2014.12)

(58) Field of Classification Search
USPC .......................................................... 700/119
See application file for complete search history.

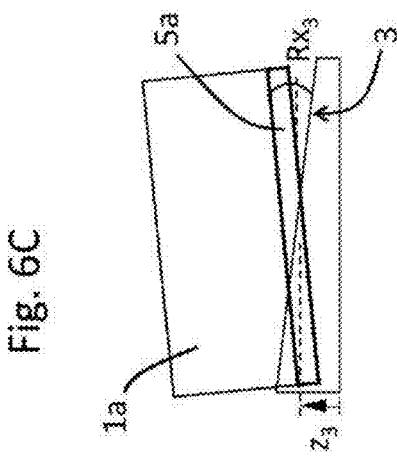
Fig. 6C
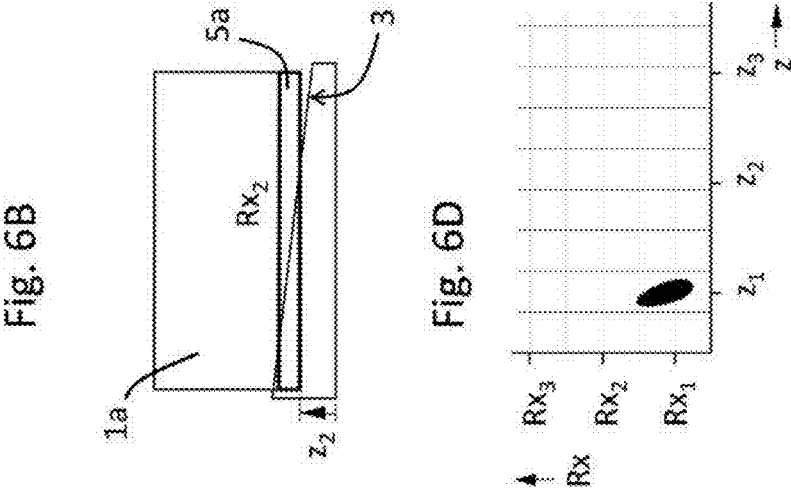
Fig. 6B
Fig. 6D
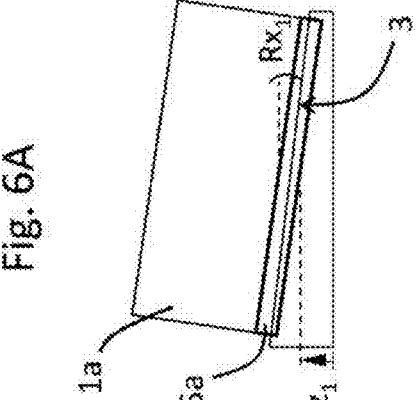
Fig. 6A

Fig. 9 - continued
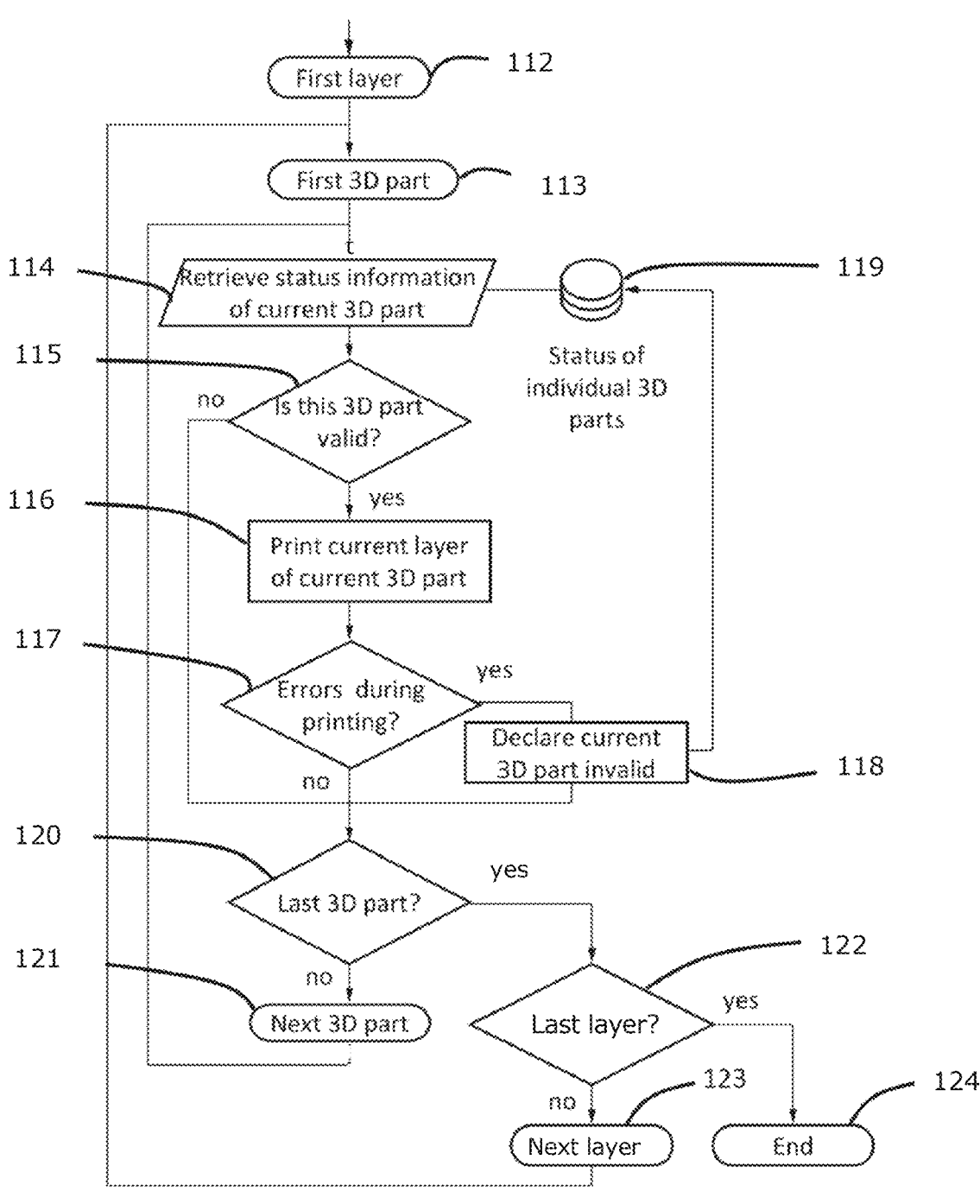

Fig. 10

EXTRUSION-BASED ADDITIVE MANUFACTURING: METHOD AND 3D PRINTING SYSTEM

FIELD OF THE INVENTION

The present invention relates to a method of extrusion-based additive manufacturing (AM), three-dimensional (3D) printing system. The invention also relates to a printing system configured to perform said method.

BACKGROUND OF THE INVENTION

In 3D printing using an extrusion-based additive manufacturing process, 3D parts are formed by layering extruded AM feedstock material in a controlled manner such that a desired 3D part can be created. Commonly, a 3D printing system is used that comprises a printhead that is moveable in a 3D space with respect to a build surface while dispensing AM feedstock material on at least one of the build surface and on previously deposited tracks of the AM feedstock material that are supported by the build surface. However, various options are available for moving the printhead and the build surface on which the 3D part is printed relative to each other.

The 3D printing system comprises a control system that is configured to control a controllable positioning system to which the printhead is attached for controlling movements of the printhead. By means of software a pattern of toolpaths can be generated, which pattern is used for moving the printhead and for depositing the tracks of extruded AM feedstock material.

The 3D part is created on the build surface in a reference location relative to the movable printhead. The AM feedstock material can be fused with previously deposited tracks. The AM feedstock material can be fed into the printhead in the form of for example filament, granulate, rod, liquid, resin or a suspension.

In case that the AM feedstock material is fed into the printhead in a solid form, a liquefying unit is used to melt the AM feedstock material and allow deposition via a nozzle on the build surface in the form of tracks forming a layer of tracks, or when a previous layer of the 3D part to be created has been deposited, on previously deposited tracks where it is allowed to solidify after the deposition. The AM feedstock material can be thermally or chemically or otherwise fused with the previously deposited tracks.

The relative motion of the build surface and the 3D part supported by it with respect to the printhead along tracks and the simultaneous deposition of AM feedstock material from the printhead allow the 3D part to be built up and to gradually attain its desired shape with each consecutively deposited track of AM feedstock material.

An advantage of extrusion-based additive manufacturing is that multiple parts either having the same or different designs can be printed in the same print job. In this way, the available production capacity can be optimally utilized. However, a disadvantage of this approach is that when printing of a particular 3D part fails the print job as a whole might have to be aborted. This can even happen just before the print job has finished. It is clear that this can result in a significant reduction of throughput and therefore in production capacity. Consequently, this can have a negative effect on the costs of printed 3D parts and can give rise to significant related financial damage.

US2020/0035015 discloses a system for generating slice data for additive manufacturing, comprises a graphics processing unit (GPU) that receives a digital model of an object in a three-dimensional build space defined over a plurality of slices, computes a three-dimensional signed distance field over voxels in the build space, assigns a building material to each voxel based on a respective distance field value, and generates slice data output pertaining to the building material assignments for each slice. The slice data output can be used for printing the object in layers corresponding to the slices.

In bitmap based systems (polyjet, multi jet fusion, and DLP), such as the system of US2020/0035015A1, the object data is rendered to 'voxels'. Voxels are 3D pixels. The use of a GPU (graphics processing unit) is therefore only commonly used in these systems, since GPUs have been found to be very fast in processing large arrays of voxels. In extrusion based printers, voxels are never used. Printed tracks are typically stored as vector based polylines, and CPUs (central processing units, i.e. microprocessors) are deployed rather than GPUs. The system of US2020/0035015 needs to decide which material, texture or color every voxel needs at the time of slicing the image data. WO2008/107866A1 discloses a method of producing an object by sequentially printing layers of construction material one on top of the other, the method comprising: providing the construction material at a first lower temperature; flowing the construction material through a heated flow path in a flow structure to heat the construction material and delivering the heated construction material to a heated reservoir in a printing head; and dispensing the heated construction material from the reservoir to build the object layer by layer.

Based on the above, there is a need to provide a method that allows improving the reliability of extrusion-based additive manufacturing and thereby improving throughput and production yield of a 3D printing system performing the method. In addition, the method should be able to allow the costs of the 3D parts obtained to be reduced, thereby allowing financial gain to be increased.

SUMMARY OF THE INVENTION

It is an object of the present invention to provide a method for improving the reliability of extrusion-based additive manufacturing, said method pre-empting or at least reducing at least one of the abovementioned and/or other disadvantages associated with extrusion-based additive manufacturing methods known in the art that are used for printing multiple 3D parts either having the same or different designs in the same print job.

It is another object of the present invention to provide an extrusion-based additive manufacturing 3D printing system that is configured to perform the method according to the present invention.

Aspects of the present invention are set out in the accompanying independent and dependent claims. Features from the dependent claims may be combined with features from the independent claim as appropriate and not merely as explicitly set out in the claims. Furthermore, all features may be replaced with other technically equivalent features.

At least one of the abovementioned objects is achieved by providing a method for enabling an extrusion-based additive manufacturing (AM) three-dimensional (3D) printing system to handle individual 3D parts of a print job comprising at least two 3D parts, the method comprising:

providing the print job that provides digital 3D representations of the at least two 3D parts;
   slicing the print job to generate a set of slices for the digital 3D representations of the at least two 3D parts, each slice of the set of slices comprising geometrical data defining respective boundaries of a respective layer of AM feedstock material that is to be deposited from a nozzle of a printing head on one of a build surface and a previously deposited layer of AM feedstock material to print each 3D part taking into account said respective boundaries;

generating for each 3D part a respective individual set of geometrical data taking into account said geometrical data provided by each slice of the set of slices, wherein each individual set of geometrical data comprises geometrical data defining the respective boundaries of the respective layers of AM feedstock material that are to be taken into account for printing the respective 3D part.

In an embodiment, the method comprises the steps of:

sending the sliced print job to an AM 3D printing system;

optimizing the print procedure for the respective AM 3D printing system by generating for each 3D part the respective individual set of geometrical data taking into account said geometrical data provided by each slice of the set of slices and taking into account parameters of the respective AM 3D printing system; and generating an individual set of control instructions for each 3D part based on the individual set of geometrical data.

In this way, the method according to the invention enables the AM 3D printing system to individually handle each 3D part of a print job that includes at least two 3D parts and optimize the printing procedure for each part individually. This increases flexibility and accuracy compared to methods handling the print job as a monolithic whole. Printing methods handle the print job as a whole, for instance, when the print job is sliced and optimized, and subsequently sent to a printer or printing system. The method of the present disclosure allows control at the level of the individual slices of the set of slices and over all respective portions of the 3D parts that are defined in a respective slice of the set of slices. The method according to the invention provides control over the respective portions of each 3D part individually within the respective slice of the set of slices. As a result of this increased level of control, the method according to the invention allows improving the reliability of extrusion-based additive manufacturing. Upon occurrence of an error regarding a portion of a particular 3D part within a particular slice, the method according to the invention allows ignoring a portion of the particular 3D part within the consecutive slice. As a result, handling of a 3D part for which an error has occurred regarding a portion of the 3D part in the previous slice can be prevented for the next slice and all slices thereafter, if the next slice is not the last slice, while continuing handling of the other portions of the remaining 3D parts defined by the next slice. Consequently, throughput and production yield of AM 3D printing systems that perform the method according to the invention can be improved. Eventually, the costs of the 3D parts that are obtained using the method according to the invention can be reduced.

The person skilled in the art will appreciate that the build surface can be one of a surface of a build plate and a surface of an intermediate structure that is arranged on the build plate and configured to enhance the adhesion between the AM feedstock material and the build surface.

In an embodiment of the method according to the invention, generating for each 3D part a respective individual set of geometrical data taking into account said geometrical data provided by each slice of the set of slices comprises:

providing the geometrical data provided by each slice of the set of slices with custom commands to group for each 3D part the respective geometrical data defining the respective boundaries of the respective layers of AM feedstock material that are to be deposited, thereby generating for each 3D part the respective individual set of geometrical data.

The custom commands can be start tags and end tags comprising a part ID. A respective set of start and end tags delimits the individual set of geometrical data for a respective 3D part.

Alternatively, the custom commands can be tags that are provided to each geometrical data element in order to indicate to which 3D part the respective geometrical data element belongs. In such a way, individual sets of geometrical data can be generated without using start and end tags.

The person skilled in the art will appreciate that the custom commands can be provided in many suitable ways. They can be added within the code of each slice of the set of slices by for example a slicing unit or by another computing unit of the AM 3D printing system. The custom commands can also be provided as an additional file that needs to be taken into account by the AM 3D printing system when processing the geometrical data provided by each slice of the set of slices.

An advantage of providing custom commands in that the order of handling 3D parts can easily be changed.

In an embodiment of the method according to the invention, generating for each 3D part a respective individual set of geometrical data taking into account said geometrical data provided by each slice of the set of slices comprises:

reconstructing each volume that is to be printed by taking into account the geometrical data provided by each slice of the set of slices and a predefined standard layer thickness with which the respective layers of AM feedstock material are to be deposited;

identifying 3D parts by comparing each reconstructed volume with each volume of each 3D part as defined by the respective digital 3D representations of the respective 3D parts; and grouping for each slice of the set of slices the respective geometrical data for each identified 3D part, thereby generating for each 3D part the respective individual set of geometrical data.

In this way, individual sets of geometrical data for each 3D part can be generated if no custom commands have been added by for example the slicing unit of the 3D printing system to the geometrical data provided by each slice of the set of slices.

In an embodiment of the method according to the invention, the method comprises:

determining for each 3D part a respective individual footprint based on the respective geometrical data for a respective first layer of AM feedstock material that is to be deposited in direct contact with the build surface provided by the respective individual set of geometrical data for the respective 3D part, each respective individual footprint being an area that is enclosed by respective boundaries of the respective first layer of AM feedstock material;

generating an individual set of control instructions for each 3D part by taking into account the respective individual set of geometrical data for the respective 3D part, wherein each individual set of control instructions enables the AM 3D system to individually control fabrication of each 3D part; and printing each 3D part on a respective individual print area of the build surface taking into account the respective individual set of control instructions for the respective 3D part, wherein the respective individual print area is equal to the respective individual footprint of the respective 3D part.

It is noted that in the context of the present invention, the individual footprint of the 3D part is determined based on the geometrical data for the first layer of AM feedstock material that must be printed for the relevant 3D part in direct contact with the build surface. The person skilled in the art will appreciate that the footprint of the 3D part that needs to be taken into account for the efficient planning of the positioning of 3D parts on the build surface with the aim of optimizing the throughput of the printing process can be different if the 3D part for example has a horseshoe-like shape wherein the free end parts of the horseshoe-like shape point in a direction facing away from the build surface.

In addition, it is noted that each individual set of control instructions can comprise electronic toolpaths. It is also possible that each individual set of control instructions comprises settings regarding post-processing such as for example annealing of the deposited AM feedstock material.

The person skilled in the art will appreciate that in accordance with the method according to the invention, the AM 3D printing system deposits a first layer of AM feedstock material for each of the 3D parts of the print job followed by a second layer of AM feedstock material for each of the 3D parts of the print job until the last layer of AM feedstock material for each of the 3D parts in the print job. In case all 3D parts in the print job are the same, all 3D parts have the same total number of layers of AM feedstock material. However, if the print job comprises 3D parts having different heights, the total number of layers of AM feedstock material are different. The person skilled in the art will appreciate that in the latter case, the 3D part or 3D parts having the highest total number of layers of AM feedstock material are the last ones to be completed.

In accordance with the above-mentioned embodiment of the method of the invention it is clear that printing each 3D part on its own individual local print area can individually be controlled as an individual set of control instructions is generated based on the respective individual set of geometrical data for the respective 3D part. Therefore, if for example an error has occurred regarding printing of a layer of AM feedstock material of a particular 3D part, printing of the next layer of AM feedstock material and of all layers thereafter, if the next layer is not the last layer, can be prevented while continuing printing of the next layer of AM feedstock material for the remaining 3D parts. As a result of the individual control offered by the method according to the invention, throughput and production yield of AM 3D printing systems that perform the method according to the invention can be improved as a printing-related failure regarding one of the 3D parts does not necessarily end the printing process of all 3D parts in the same print job.

In an embodiment of the method according to the invention, generating the individual set of control instructions for each 3D part also comprises:

transforming a coordinate system of the respective 3D part to align a bottom surface of the respective 3D part with the build surface of the 3D printing system;

determining distances between the bottom surface of the respective 3D part and the build surface at predefined locations across the respective individual print area onto which the respective 3D part is to be printed for determining a distance distribution over the entire respective individual print area;

determining a minimum distance, $d_{min}$, and a maximum distance, $d_{max}$, of the determined distance distribution;

generating the respective individual set of control instructions for the respective 3D part using the determined distance distribution if $d_{min}$ and $d_{max}$ satisfy a condition $t_{min} \leq d_{min} < d_{max} \leq t_{max}$, wherein $t_{min}$ is a predefined minimum thickness and $t_{max}$ is a predefined maximum thickness of the respective first layer of AM feedstock material, wherein after having been deposited, the respective first layer of AM feedstock material provides a substantially planar top surface on which a next layer of AM feedstock material is printable.

In this way, it is possible to determine on which individual print areas on the build surface the corresponding 3D parts can be printed with a first layer of AM feedstock material that is continuous over the entire individual print area. The thickness of the first layer of AM feedstock material, which is determined taking the distance distribution into account, ranges between the predefined minimum thickness $t_{min}$ and the predefined maximum thickness $t_{max}$. The first layer of AM feedstock material provides a substantially flat top surface on which a next layer of AM feedstock material can be deposited to print the respective 3D part.

With respect to individual print areas for which the minimum distance, $d_{min}$, and the maximum distance, $d_{max}$, of the determined distance distribution do not satisfy the above-mentioned condition $t_{min} \leq d_{min} < d_{max} \leq t_{max}$, the first layer of AM feedstock material cannot be deposited as a continuous layer that provides a substantially planar or flat top surface. In that case, generating the respective individual set of control instructions for the respective 3D part is cancelled or execution of the individual set of control instructions for the respective 3D part is cancelled. In both cases, printing of the respective 3D part is prevented because the individual print area is not in a suitable condition for allowing reliable printing of at least the first layer of AM feedstock material.

The person skilled in the art will appreciate that depending on a predefined threshold for the number of 3D parts for which printing is prevented because $d_{min}$ and $d_{max}$ on their respective individual print area do not satisfy the condition $t_{min} \leq d_{min} < d_{max} \leq t_{max}$, the 3D printing system can be configured to generate a service alert indicating that the build surface needs to be re-aligned or needs to be exchanged. The 3D printing system can be configured to send a warning alert that the above-mentioned predefined threshold is soon to be reached. In this way, operators can already anticipate the service alert and take appropriate measures such as for example ordering of a new build surface.

The predefined locations across a respective individual print area for determining the distances between the bottom surface of the respective 3D part and the build surface can be obtained using an algorithm or through additional custom commands.

The person skilled in the art will appreciate that the distances can be determined in a number of ways, such as via measurement and/or calculation. The distance distribution can also be determined in a number of ways. It is possible that the distance distribution contains the distances determined at the predefined locations. Alternatively, the distance distribution comprises the distances determined at the predefined locations and values for distances between the bottom surface of the respective 3D part and the build surface at locations outside the predefined locations that are obtained via for example estimation or interpolation based on the distances at the predefined locations.

The person skilled in the art will appreciate that in the context of the present invention it would also be possible to use more than one layer of feedstock material to level out any non-flatness of the build surface to eventually obtain a substantially planar or flat top surface. In this situation, if for example n layers are used, the condition to be satisfied becomes $n \cdot t_{min} \leq n \cdot d_{min} < n \cdot d_{max} \leq n \cdot t_{max}$.

In an embodiment of the method according to the invention, the respective individual set of control instructions for the respective 3D part is generated after performing an individual coordinate transformation of the respective 3D part in order to allow $d_{min}$ and $d_{max}$ to satisfy the condition $t_{min} \leq d_{min} < d_{max} \leq t_{max}$. In this way, printing of the respective 3D part can still be done because of the individual coordinate transformation without which reliable printing of the first layer of AM feedstock material on the individual print area would not have been possible. Hence, the individual coordinate transformation can delay at least one of the above-mentioned warning alert, the service alert and re-alignment or exchange of the build surface.

In an embodiment of the method according to the invention, the individual coordinate transformation of the respective 3D part involves at least one of:

translation along the z-axis of the coordinate system of the respective 3D part;

rotation Rx around the x-axis of the coordinate system of the respective 3D part; and rotation Ry around the y-axis of the coordinate system of the respective 3D part.

The person skilled in the art will appreciate that without coordinate transformation of the respective 3D part, the first layer of AM feedstock material depending on the tilt and the flatness or topography of the build surface can either be printed or not, as was explained above. The so-called solution space is 0-dimensional or a single Boolean value.

Furthermore, if the coordinate transformation only involves a translation along the z-axis of the coordinate system of the respective 3D part, a so-called Z-offset, it will be clear that depending on the shape of the footprint of a respective 3D part and the flatness and tilt of the build surface, there may or may not be a range of Z-offsets for which the first layer of AM feedstock is within the range of printable layer thicknesses, i.e. $t_{min}$ and $t_{max}$. In that case, the solution space is a 1-dimensional space which may or may not contain Z-offsets for which the layer thickness of the first layer of AM feedstock is in the valid range, i.e. between $t_{min}$ and $t_{max}$.

In case the coordinate transformation of the respective 3D part involves two of the above-mentioned options, for example a Z-offset and a rotation Rx, a Z-offset and a rotation Ry, or a rotation Rx and a rotation Ry, a 2-dimensional solution space occurs. In this case, there also may or may not be coordinate transformations of the respective 3D part in the solution space that allow the first layer of AM feedstock material to be printed on the respective individual print area.

Similarly, if the coordinate transformation of the respective 3D part involves the Z-offset, rotation Rx and rotation Ry, a 3-dimensional solution space can be constructed. Again, also in this case, there may or may not be coordinate transformations of the respective 3D part in the solution space that allow the first layer of AM feedstock material to be printed on the respective individual print area.

The person skilled in the art will appreciate that if in none of the above-mentioned 0-, 1-, 2- or 3-dimensional solutions spaces a suitable coordinate transformation of the respective 3D part can be determined, the first layer of AM feedstock material cannot be printed on the respective individual print are of the 3D part. Consequently, generating the respective individual set of control instructions for the respective 3D part is cancelled or execution of the individual set of control instructions for the respective 3D part is cancelled. In both cases, printing of the respective 3D part is prevented because the individual print area is not in a suitable condition for allowing reliable printing of at least the first layer of AM feedstock material.

Moreover, the person skilled in the art will appreciate that if a coordinate transformation in any one of the above-mentioned 0-, 1-, 2- or 3-dimensional solutions spaces can be selected, upon applying the coordinate transformation to the respective 3D part, the respective individual set of control instructions for the respective 3D part is generated using the determined distance distribution. Consequently, the first layer of AM feedstock material can be printed on the individual print area of the respective 3D part. The person skilled in the art will appreciate that the substantially planar or flat top surface of the first layer of AM feedstock material is not necessarily arranged parallel to the build surface. Depending of the coordinate transformation chosen, the planar of flat top surface of the first layer of AM feedstock material may be skewed with respect to the coordinate system of the build surface.

It is noted that determining if there are solutions in any one of the solution spaces mentioned above can be done using for example an iterative process or in an analytical way. Furthermore, there may be solutions within any one of the above-mentioned solution spaces for which the shape of the bottom surface of the printed 3D part is closer to the intended shape than for other solutions. This criterion may be used to choose a particular coordinate transformation within any one of the above-mentioned solution spaces, thereby arriving at an optimal coordinate transformation of the respective 3D part.

The person skilled in the art will appreciate that the method according to the present invention is more tolerant for build surface topography as the requirements on the build surface flatness can be less strict. In addition, if the build surface becomes bent after a certain number of thermal cycles, the method according to the invention allows postponing replacement of the build surface. As a result, operational and service costs can be reduced.

In an exemplary embodiment of the method according to the invention, a mathematical plane can be calculated using the distances between the bottom surface of the respective 3D part and the build surface that have been determined at the predefined locations across the respective individual print area onto which the respective 3D part is to be printed. The mathematical plane, which for example can be obtained by performing a least squares fit to the determined distance values, can be used to determine a suitable coordinate transformation of the 3D part that allows printing of the first layer of AM feedstock material as a continuous layer that provides a substantially planar or flat top surface as has been explained above.

In an embodiment of the method according to the invention, determining the individual coordinate transformation for the respective 3D part further comprises taking into account a determined non-straightness of at least one of an x-axis arrangement, a y-axis arrangement and a z-axis arrangement of the AM 3D printing system. In this way, it is possible to compensate for example for any non-orthogonality of at least two axis arrangements of the AM 3D printing system with respect to each other, i.e. a non-orthogonality of at least two of the x-axis arrangement, the y-axis arrangement and the z-axis arrangement of the AM 3D printing system with respect to each other.

In an embodiment of the method according to the invention, the distances between the bottom surface of the respective 3D part and the build surface at predefined locations across the respective individual print area are determined using results obtained by at least one of a contactless measurement technique and a measurement technique that involves a physical contact between the build surface and at least one of a probing arrangement that is associated with the printing head, and the nozzle of the printing head. The results obtained by either one of the measurement techniques enable determining topography information of the build surface at the predefined locations across the individual print area of a 3D part. This topography information can be used to determine the distances between the bottom surface of the 3D part and the build surface at these predefined locations.

The person skilled in the art will appreciate that suitable contactless measurement techniques include for example a capacitive measurement technique, wherein the probing arrangement comprises a capacitive proximity sensor, an inductive measurement technique, wherein the probing arrangement comprises an inductive proximity sensor, a magneto-inductive measurement technique, wherein the probing arrangement comprises a magneto-inductive distance sensor, an electro-optical measurement technique, wherein the probing arrangement comprises an electro-optical proximity sensor, an optical measurement technique, e.g. lidar, wherein the probing arrangement comprises an optical proximity sensor, an acoustic measurement technique, e.g. sonar, wherein the probing arrangement comprises an acoustic proximity sensor, and an electromagnetic measurement technique, wherein the probing arrangement comprises an antenna adapted for transmitting and receiving electromagnetic radiation.

The person skilled in the art will appreciate that suitable measurement techniques that involve a physical contact between the build surface and at least one of a probing arrangement that is associated with the printing head, and the nozzle of the printing head include for example a pressure-controlled measurement technique, wherein at least one of a counterforce exerted on the nozzle and a displacement of the nozzle is determined as a result of a physical contact between the nozzle and the build surface, an electric measurement technique, e.g. measurement of motor current or lag error increase on the z-stage for providing the Z-offset of the build surface, or measurement of an electric current as a result of a physical contact between the nozzle and the build surface that are at different potentials before the physical contact, a thermal measurement technique, wherein a heat flow is measured as a result of a physical contact between the nozzle and the build surface, and a mechanical measurement technique, wherein the probing arrangement comprises at least one of a mechanical probing sensor and a microswitch.

In an embodiment of the method according to the invention, the predefined minimum thickness, $t_{min}$, of the respective first layer of AM feedstock material is equal to 50% of a predefined standard layer thickness with which respective other layers of AM feedstock material than the respective first layer of AM feedstock material are to be deposited, and the predefined maximum thickness, $t_{max}$, of the respective first layer of AM feedstock material is equal to 150% of said predefined standard layer thickness.

If for example a predefined standard layer thickness of 0.2 mm is chosen, the predefined maximum thickness of the first layer of AM feedstock material is equal to 0.3 mm and the predefined minimum thickness of the first layer of AM feedstock material is equal to 0.1 mm.

The person skilled in the art will appreciate that in accordance with the above-mentioned embodiments of the method according to the invention, a respective 3D part is only printed on the individual print area if the topography of the build surface within the individual print area can be accommodated within a first layer of AM feedstock material. As the first layer of AM feedstock material has a thickness of at most 150% of the standard layer thickness, it will be clear that in contrast with methods known in the art, printing of an unnecessary thick first layer in order to accommodate the topography of the build surface can be avoided.

In an embodiment of the method according to the invention, prior to printing each 3D part on a respective individual print area of the build surface, a respective 3D part of the at least two 3D parts is individually rejected upon determining that no respective individual set of control instructions has been generated for the respective 3D part thereby avoiding starting printing of the respective 3D part on the respective individual print area. In this way, printing of 3D parts can individually be prevented as a result of the absence of an individual set of control instructions for that 3D part because the build surface of the individual local print area is not within spec, i.e. the minimum distance, $d_{min}$, and the maximum distance, $d_{max}$, of the determined distance distribution do not satisfy the above-mentioned condition $t_{min} \leq d_{min} < d_{max} \leq t_{max}$. In this way, the 3D part concerned is not involved in the printing process from the outset.

In an embodiment of the method according to the invention, printing each 3D part on a respective individual print area of the build surface taking into account the respective individual set of control instructions for the respective 3D part further comprises:

individually terminating printing a respective 3D part of the at least two 3D parts upon detecting an error associated with at least one deposited layer of AM feedstock material of the respective 3D part while continuing printing a respective non-rejected 3D part of the at least two 3D parts until all layers of AM feedstock have been deposited for the respective non-rejected 3D part or all 3D parts have been rejected.

The person skilled in the art will appreciate that printing errors can occur at any time during the printing process and in relation to any one of the deposited layers of AM feedstock material. If for example an error has occurred regarding printing of a layer of AM feedstock material of a particular 3D part, printing of the next layer of AM feedstock material and of all layers thereafter, if the next layer is not the last layer, can be prevented while continuing printing of the next layer of AM feedstock material for the remaining 3D parts. As a result of the individual control offered by the method according to the invention, throughput and production yield of AM 3D printing systems that perform the method according to the invention can be improved as a printing-related failure regarding one of the 3D parts does not necessarily end the printing process of all 3D parts in the same print job. An example of a printing-related error is the formation of so-called spaghetti. Another example is that the entire stack of deposited layers becomes detached from the build surface due to adhesion problems. The adhesion problems can be caused by stress in the deposited layers of AM feedstock material. It is also possible that no feedstock material has been printed because of clogging of the nozzle of the printhead or because the AM feedstock material had run out. Another printing-related error is that the shape of the printed 3D part deviates too much from the shape that was expected according to the digital 3D representation of the 3D part.

The person skilled in the art will appreciate that there are many ways to detect printing-related errors. One of them is the use of camera and computer vision hardware and software. It is also possible to measure the force between the 3D part and the printhead or to measure the pressure inside the nozzle of the printhead to determine if feedstock material is printed. It is also possible to analyze the printing instructions to reconstruct the expected signal or visual representation to recognize whether the 3D printer has failed printing a 3D part.

In an embodiment of the method according to the invention, for each individually rejected 3D part a respective waiting time is generated that has a duration that is equal to a respective deposition time that would have been required for depositing the respective next layer of AM feedstock material for the respective individually rejected 3D part, wherein the respective waiting time for each individually rejected 3D part is taken into account when depositing the respective next layer of AM feedstock material for each respective non-rejected 3D part of the at least two 3D parts to maintain validity of a thermal simulation result that has been obtained by performing a thermal simulation taking into account the respective individual set of control instructions for each 3D part prior to starting printing each 3D part on a respective individual print area of the build surface.

As a result of the waiting time, the validity of a thermal simulation result obtained prior to printing the at least two 3D parts can be maintained. If no waiting time would be generated for a respective individually rejected 3D part, then as a result of canceling the deposition of the respective next layer of AM feedstock material for the respective rejected 3D part, the deposition of the next layer for a respective non-rejected 3D part would take place earlier than expected based on the thermal simulation. As a result, the obtained simulation result would no longer be valid. By generating a respective waiting time for each respective individually rejected 3D part that is equal to the time it would have taken to deposit the next layer of AM feedstock material for the respective individually rejected 3D part, the next layer of the respective non-rejected 3D part can be deposited at the same time as expected in accordance with the thermal simulation. This allows the validity of the thermal simulation result to be maintained despite individual rejection of 3D parts for which errors occur during the actual printing process.

In an exemplary embodiment of the method according to the invention, prior to generating the respective individual set of control instructions for each 3D part, at least the build surface and the nozzle of the printing head of the 3D printing system can be heated to a predefined operating temperature at which the respective layers of AM feedstock material are to be printed. The person skilled in the art will appreciate that each kind of AM feedstock material such as PEEK or any other polymer-based material suitable for AM 3D printing, has its optimal operating temperature for printing. The person skilled in the art will appreciate that it is important that the condition of the build surface of the respective individual local print areas of the respective 3D parts is determined after the build surface has been brought to the predefined operating temperature. If the condition, i.e. topography, of the build surface of the local print areas is determined when the build surface is not yet at the predefined operating temperature, changes in the build surface of the local print areas that might arise during heating of the build surface from room temperature to the predefined operating temperature can negatively influence the accuracy with which the condition of the build surface of the respective local print areas can be determined.

In an embodiment of the method according to the invention, printing each 3D part on a respective individual print area of the build surface taking into account the respective individual set of control instructions for the respective 3D part further comprises:

depositing the respective first layer of AM feedstock material in contact with the build surface of the respective individual print area of the respective 3D part and depositing respective next layers of AM feedstock material on top of each other starting from the respective first layer, the respective next layers of AM feedstock material having identical characteristics whereas the respective first layer of AM feedstock material has at least one characteristic that distinguishes the respective first layer from the respective next layers thereby enabling, after printing of the respective 3D part has been terminated, an improved removability of the respective first layer from the respective next layers of AM feedstock material without causing delamination of the respective next layers from each other.

In this way, the first layer of AM feedstock material can be removed more easily from the subsequent layers of AM feedstock material after the 3D part has been printed. The at least one feature that distinguishes the first layer of AM feedstock material from the subsequent layers of AM feedstock material, all of which have identical characteristics, may be a porous structure of the first layer of AM feedstock material that allows the first layer of AM feedstock material for example to be peeled off easier from the subsequent layer of AM feedstock material. In addition to a structural feature, i.e. a porous structure, the at least one feature that distinguishes the first layer of AM feedstock material from the subsequent layers of AM feedstock material may also be a material property such as a solubility in a solvent, which under otherwise equal conditions such as temperature and pressure, is higher than the solubility of the AM feedstock material that is used for printing the subsequent layers. In this way, it is possible to selectively separate the first layer of AM feedstock material and the stack of subsequent layers of AM feedstock material from each other in a chemical manner after printing of the 3D part without separating the subsequent layers of AM feedstock material from each other. An advantage of using soluble AM feedstock material for the first layer is that separating the first layer from the subsequent layers in this case results in less scars on the layer of the stack of subsequent layers that is deposited directly on the first layer than in the case that the first layer is peeled off from said layer of the stack of subsequent layers. A first layer of AM feedstock material as described above is commonly referred to as a raft. The person skilled in the art will appreciate that as a result of applying the method according to the present invention, the raft can be printed with a varying thickness across the individual print areas of the corresponding 3D parts to accommodate the topography of the build surface of the individual print area. As mentioned above, an advantage of the method according to the present invention is that the raft can have a reduced thickness as compared to a raft that is printed using a method known in the art.

According to another aspect of the present invention, an extrusion-based additive manufacturing, AM, three-dimensional, 3D, printing system is provided that is adapted to handle individual 3D parts of a print job comprising at least two 3D parts instead of handling the print job as a whole. The extrusion-based AM 3D printing system comprises a processing unit that is provided with computer instructions which when executed in the processing unit enable the extrusion-based AM 3D printing system to perform the method according to the present invention.

The person skilled in the art will appreciate that the processing unit of the 3D printing system according to the invention is operatively connected with all relevant parts of the 3D printing system that are required to print a 3D part using an extrusion-based additive manufacturing process. The 3D printing system according to the invention is thus adapted to provide the 3D part with an improved reliability and all associated advantages discussed above.

BRIEF DESCRIPTION OF THE DRAWINGS

Further features and advantages of the invention will become apparent from the description of the invention by way of exemplary and non-limiting embodiments of a method and a 3D printing system according to the invention.

The person skilled in the art will appreciate that the described embodiments of the method and the 3D printing system according to the invention are exemplary in nature only and not to be construed as limiting the scope of protection in any way. The person skilled in the art will realize that alternatives and equivalent embodiments of the method and the 3D printing system can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

FIGS. 6A-6C show schematic side views of a 3D part in accordance with the fourth exemplary, non-limiting embodiment of the 3D part shown in FIG. 3, wherein for different Z-offsets and different rotations Rx around the x-axis of the coordinate system of the 3D part it is determined whether the first layer of AM feedstock material can successfully be printed on the individual print area of the 3D part in accordance with the method according to the invention or not;

FIG. 6D shows a schematic and non-limiting example of a 2-dimensional solution space for the Z-offset and the rotation Rx in accordance with which the first layer of AM feedstock material can successfully be printed on the individual print area of the 3D part in accordance with the method according to the invention or not;

FIG. 10 shows a schematic representation of a 3D printing system according to the present invention, the 3D printing system comprising a processing unit that is adapted to print a 3D part using the method according to the invention.

DETAILED DESCRIPTION OF EMBODIMENTS

The invention will be further elucidated in exemplary embodiments thereof as described below.

Figures 1A, 1B:
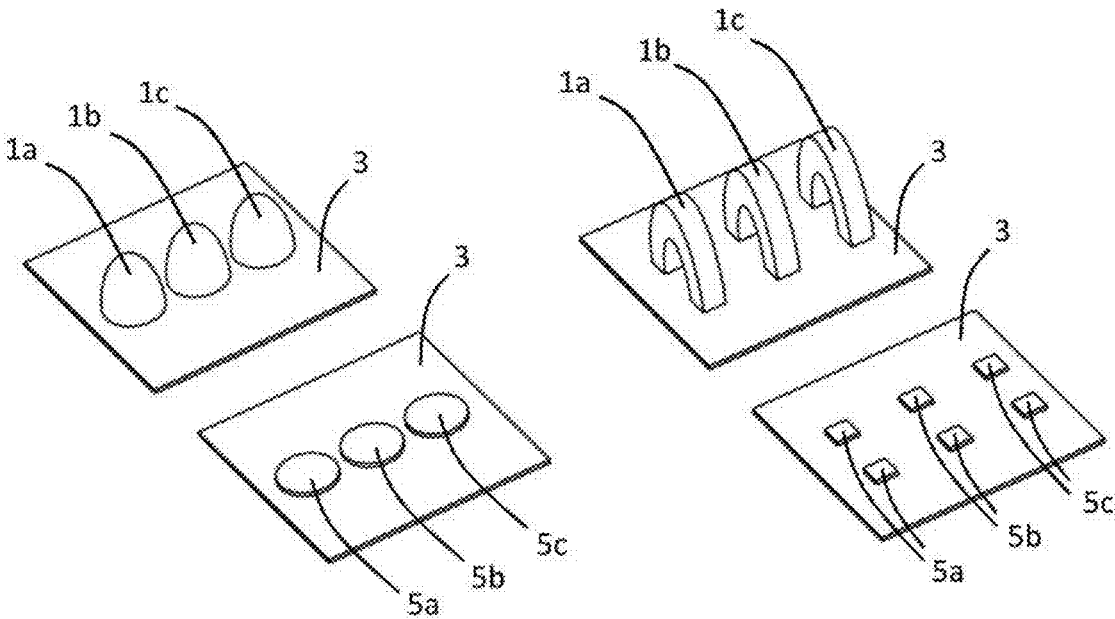
FIG. 1A shows in the top part a schematic isometric view of a first exemplary, non-limiting embodiment of 3D parts that can be printed with the method according to the invention and in the lower part an isometric view of first layers of AM feedstock material for each of the 3D parts that are deposited on the build surface of individual print areas of each of these 3D parts.
FIG. 1B shows in the top part a schematic isometric view of a second exemplary, non-limiting embodiment of 3D parts that can be printed with the method according to the invention and in the lower part an isometric view of first layers of AM feedstock material for each of the 3D parts that are deposited on the build surface of individual print areas of each of these 3D parts.

In the top part of FIG. 1A, schematic isometric views of a first exemplary, non-limiting embodiment of three 3D parts 1a, 1b, 1c are shown that can be printed with the method according to the invention each on an individual print area of the build surface 3. In the lower part of FIG. 1A, an isometric view of the three respective first layers 5a, 5b, 5c of AM feedstock material for each of the 3D parts 1a, 1b, 1c are shown that are deposited on their respective individual print area of the build surface 3. The same holds for FIGS. 1B and 1C in which isometric views of respectively a second exemplary, non-limiting embodiment and a third exemplary, non-limiting embodiment of the 3D parts and their respective first layers of AM feedstock material are shown. In accordance with the method of the present invention, the three 3D parts 1a, 1b, 1c can be handled individually. In this way, the method allows improving the reliability of extrusion-based additive manufacturing and thereby improving throughput and production yield of a 3D printing system performing the method. Consequently, costs of 3D parts obtained using the method can be reduced.

In accordance with the method of the invention, the print job comprises digital 3D representations of the three 3D parts. Upon slicing the print job a set of slices for the digital 3D representations of the three 3D parts is generated. Each slice of the set of slices comprises geometrical data defining respective boundaries of a respective layer of AM feedstock material. The individual handling of the three 3D parts 1a, 1b, 1c is enabled by generating for each 3D part a respective individual set of geometrical data taking into account the geometrical data that is provided by each slice of the set of slices. Each individual set of geometrical data comprises geometrical data defining the respective boundaries of the respective layers of AM feedstock material that are to be taken into account for printing the respective 3D part. The layers of AM feedstock material constituting each one of the three 3D parts 1a, 1b, 1c can be deposited from a nozzle of a printing head on a respective individual print area of the build surface 3 or on a previously deposited layer of AM feedstock material if individual sets of control instructions have been generated for each 3D part by taking into account the respective individual sets of geometrical data for the respective 3D parts.

Generating for each 3D part 1a, 1b, 1c a respective individual set of geometrical data taking into account said geometrical data provided by each slice of the set of slices can be done in different ways.

A first way comprises providing the geometrical data provided by each slice of the set of slices with custom commands to group for each 3D part the respective geometrical data defining the respective boundaries of the respective layers of AM feedstock material that are to be deposited. The custom commands can be start tags and end tags comprising a part ID. A respective set of start and end tags delimits the individual set of geometrical data for a respective 3D part. Alternatively, the custom commands can be tags that are provided to each geometrical data element in order to indicate to which 3D part the respective geometrical data element belongs. In such a way, individual sets of geometrical data can be generated without using start and end tags.

A second way comprises reconstructing each volume that is to be printed by taking into account the geometrical data provided by each slice of the set of slices and a predefined layer thickness with which the respective layers of AM feedstock material are to be deposited. By comparing each reconstructed volume with each volume of each 3D part as defined by the respective digital 3D representations of the respective 3D parts, the individual 3D parts can be identified. The person skilled in the art will appreciate that the predefined layer thickness can have different values for different slices of the set of slices depending on the location in the 3D part to be printed. For example, when printing a hemisphere, the predefined layer thickness for slices related to top layers of the hemisphere which define the outer surface of the hemisphere, can have a smaller value than the predefined layer thickness for slices related to bottom layers of the hemisphere. In this way, a smoother outer surface of the top of the printed hemisphere can be achieved.

Figure 1C:
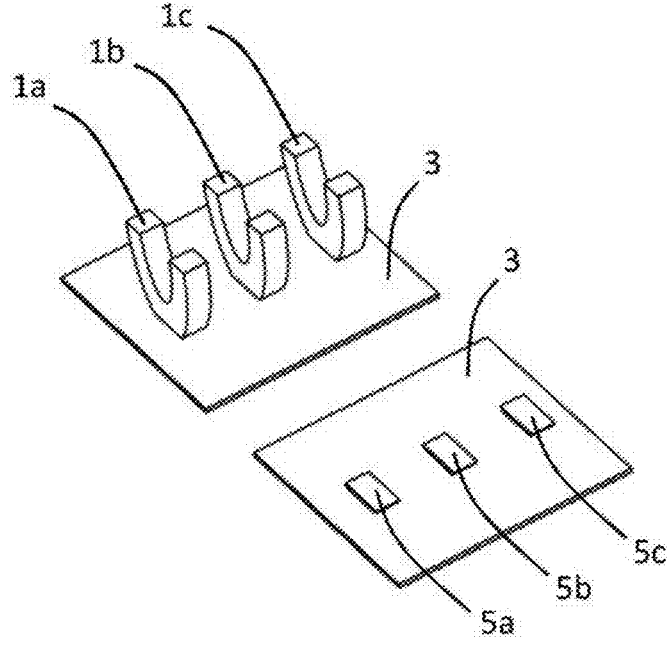
FIG. 1C shows in the top part a schematic isometric view of a third exemplary, non-limiting embodiment of 3D parts that can be printed with the method according to the invention and in the lower part an isometric view of first layers of AM feedstock material for each of the 3D parts that are deposited on the build surface of individual print areas of each of these 3D parts.

Having regard to FIGS. 1A, 1B and 1C, the person skilled in the art will appreciate that the above-mentioned two ways can be applied to generate for each 3D part 1a, 1b, 1c a respective individual set of geometrical data. Especially for the exemplary embodiments of the 3D parts shown in FIGS. 1B and 1C, the person skilled in the art will appreciate the benefits of the above-mentioned ways for generating the respective individual sets of geometrical data.

Figure 2B:
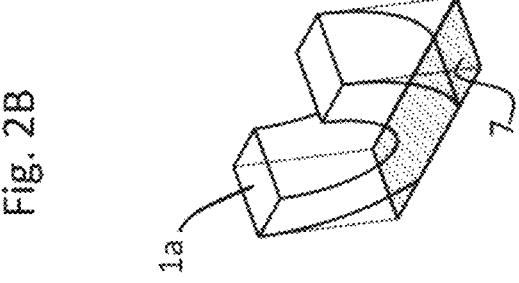
FIG. 2B shows a schematic isometric view of one of the 3D parts shown in FIG. 1C and an illustration of a different interpretation of the individual footprint of a 3D part.
Figure 2A:
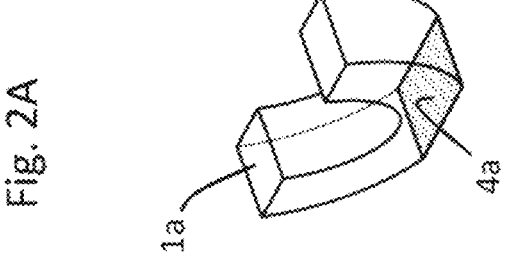
FIG. 2A shows a schematic isometric view of one of the 3D parts shown in FIG. 1C and an illustration of how the individual footprint of 3D part is to be construed in the context of the present invention.

FIG. 2A shows a schematic isometric view of one of the 3D parts shown in FIG. 1C. The highlighted plane illustrates how the individual footprint 4a of 3D part 1a is to be construed in the context of the present invention. The individual footprint 4a of the 3D part 1a relevant for the method of the present invention is determined based on the geometrical data for the first layer 5a of AM feedstock material that must be printed for the 3D part 1a in direct contact with the build surface 3. The person skilled in the art will appreciate that also other definitions of the term "footprint" can be envisaged. For example, the footprint of the 3D part 1a that needs to be taken into account for the efficient planning of the positioning of 3D parts on the build surface with the aim of optimizing the throughput of the printing process is a different footprint than the footprint 4a shown in FIG. 2A. The highlighted plane illustrated in the schematic isometric view of the 3D part 1a shown in FIG. 2B, is the relevant footprint 7 for the latter purposes. Comparison of FIGS. 2A and 2B clearly shows that the footprint 4a of the 3D part in the context of the present invention as shown in FIG. 2A is smaller than the footprint 7 shown in FIG. 2B. Having regard to the exemplary embodiment of the 3D parts shown in FIG. 1A, the person skilled in the art will appreciate that the footprint in accordance with the definition illustrated in FIG. 2A for the 3D parts of FIG. 1A is equal to the footprint in accordance with the definition illustrated in FIG. 2B.

Figure 3:
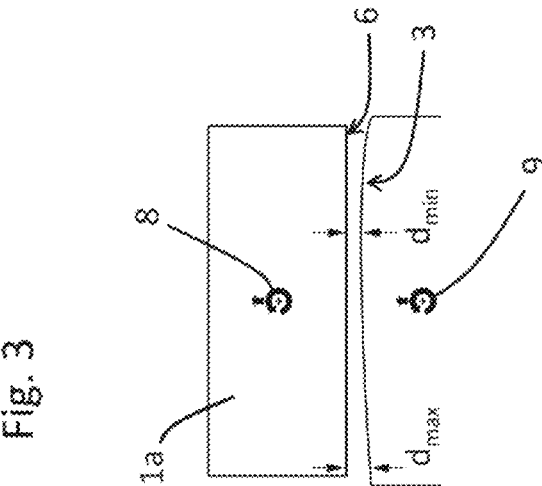
FIG. 3 shows a schematic side view of a fourth exemplary, non-limiting embodiment of a 3D part that is deposited on an individual print area of the build surface.

FIG. 3 shows a schematic side view of a fourth exemplary, non-limiting embodiment of a 3D part that is deposited on an individual print area of the build surface. The person skilled in the art will appreciate that only a part of the build surface slightly larger than the individual footprint of the 3D part is shown. FIG. 3 shows that the 3D part 1a has a coordinate system 8 and that the build surface 3 of the 3D printing system has a coordinate system 9. In order to generate the individual set of control instructions for each 3D part, the method according to the invention comprises the step of transforming the coordinate system 8 of the 3D part 1a to align a bottom surface 6 of the 3D part with the build surface 3 of the 3D printing system. Next, distances between the bottom surface 6 of the 3D part 1a and the build surface 3 are determined. This can be done at predefined locations across the individual print area onto which the respective 3D part 1a is to be printed. The person skilled in the art will appreciate that the predefined locations and the number thereof can be obtained using an algorithm or through additional custom commands that are provided to the 3D printing system. As mentioned above, the person skilled in the art will appreciate that the distances can be determined in a number of ways, such as via measurement and/or calculation. The determined distances are used to determine a distance distribution over the entire individual print area. As mentioned above, the person skilled in the art will appreciate that the distance distribution can also be determined in a number of ways. Upon having determined the distance distribution, a minimum distance, $d_{min}$, and a maximum distance, $d_{max}$ can be determined. Only if $d_{min}$ and $d_{max}$ satisfy a condition $t_{min} \leq d_{min} < d_{max} \leq t_{max}$, wherein $t_{min}$ is a predefined minimum thickness and $t_{max}$ is a predefined maximum thickness of the first layer of AM feedstock material, the individual set of control instructions for the 3D part 1a is generated.

Figure 4A:
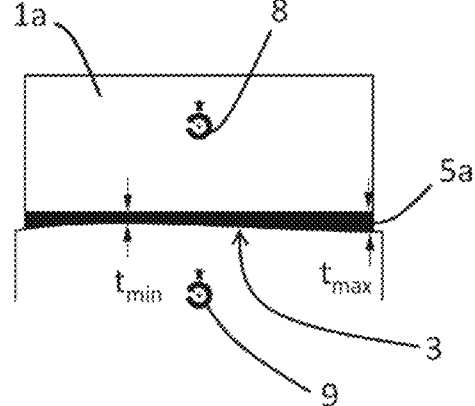
FIG. 4A shows a schematic side view of a 3D part in accordance with the fourth exemplary, non-limiting embodiment of the 3D part shown in FIG. 3, wherein the first layer of AM feedstock material has successfully been printed on the individual print area of the 3D part in accordance with the method according to the invention.

As described above, in this way the method according to the invention allows to determine on which individual print areas on the build surface the corresponding 3D parts can be printed with a first layer of AM feedstock material that is continuous over the entire individual print area. The determined distance distribution is used to determine a thickness distribution of the first layer of AM feedstock material over the entire individual print area. The thickness of the first layer of AM feedstock material ranges between the predefined minimum thickness $t_{min}$ and the predefined maximum thickness $t_{max}$. After having been deposited, the first layer 5a of AM feedstock material provides a substantially planar top surface on which a next layer of AM feedstock material is printable. This is shown in FIG. 4A that shows a schematic side view of a 3D part in accordance with the fourth exemplary, non-limiting embodiment of the 3D part 1a shown in FIG. 3, wherein the first layer 5a of AM feedstock material has successfully been printed on the individual print area of the 3D part.

Figure 4B:
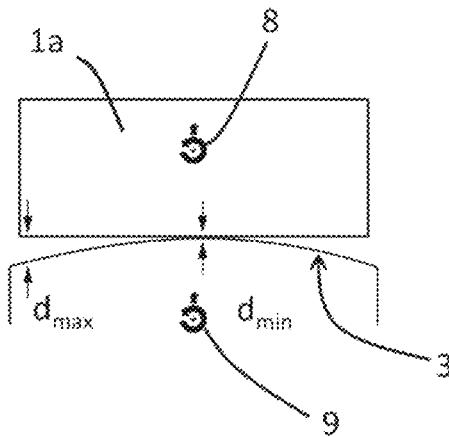
FIG. 4B shows a schematic side view of a 3D part in accordance with the fourth exemplary, non-limiting embodiment of the 3D part shown in FIG. 3, wherein the first layer of AM feedstock material cannot be printed on the individual print area of the 3D part in accordance with the method according to the invention.

As mentioned above, if $d_{min}$ and $d_{max}$ do not satisfy the condition $t_{min} \leq d_{min} < d_{max} \leq t_{max}$, the first layer of AM feedstock material cannot be deposited as a continuous layer that provides a substantially planar or flat top surface. This is shown in FIG. 4B that shows a schematic side view of a 3D part in accordance with the fourth exemplary, non-limiting embodiment of the 3D part 1a shown in FIG. 3, wherein the first layer of AM feedstock material cannot be printed on the individual print area of the 3D part because at least $t_{min} \leq d_{min}$ is not valid. This can clearly be seen by comparing FIGS. 4A and 4B. In that case shown in FIG. 4B, generating the individual set of control instructions for the 3D part is cancelled or execution of the individual set of control instructions for the 3D part is cancelled. In both cases, printing of the 3D part is prevented because the individual print area is not in a suitable condition for allowing reliable printing of at least the first layer of AM feedstock material.

Based on the above, the person skilled in the art will appreciate that without any coordinate transformation of the 3D part 1a, the first layer 5a of AM feedstock material can either be printed or not. Therefore, the so-called solution space is 0-dimensional or a single Boolean value. As described above, in accordance with an embodiment of the method according to the invention, the individual set of control instructions for the 3D part 1a shown in FIG. 4B could still be generated if a suitable individual coordinate transformation of the 3D part 1a can be determined that allows for the individual print area of the 3D part 1a that $d_{min}$ and $d_{max}$ satisfy the condition $t_{min} \leq d_{min} < d_{max} \leq t_{max}$. In this way, printing of the 3D part 1a can still be done. Hence, the individual coordinate transformation can delay at least one of the above-mentioned warning alert, the service alert and re-alignment or exchange of the build surface 3.

Figures 7A, 7B:
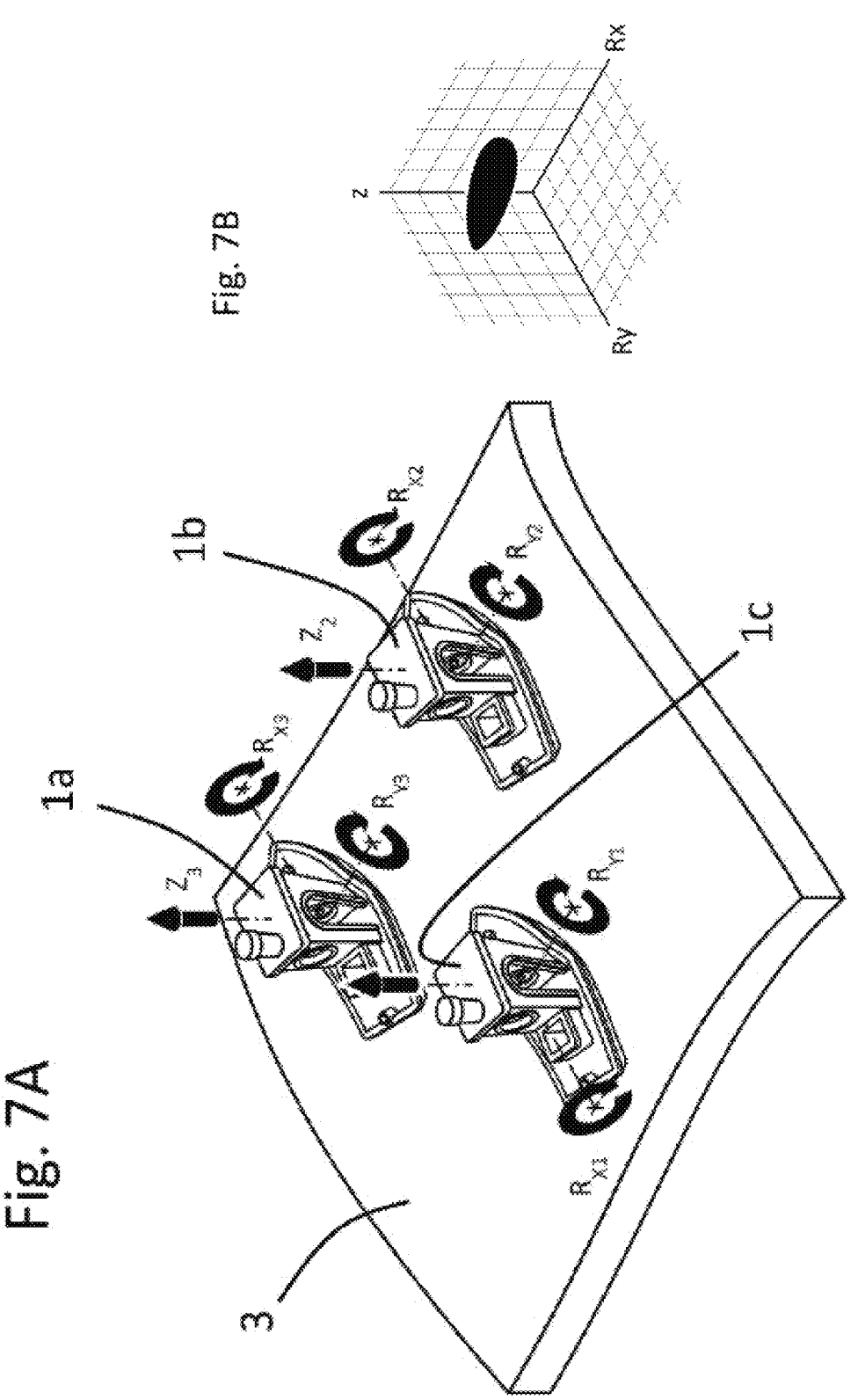
FIG. 7A shows a schematic isometric view of 3D parts in accordance with a fifth exemplary, non-limiting embodiment thereof, wherein for different Z-offsets, different rotations Rx and different rotations Ry around the y-axis of the coordinate system of the 3D part it is determined whether the first layer of AM feedstock material can successfully be printed on the individual print area of the 3D part in accordance with the method according to the invention or not.
FIG. 7B shows a schematic and non-limiting example of a 3-dimensional solution space for the Z-offset, rotation Rx and rotation Ry in accordance with which the first layer of AM feedstock material can successfully be printed on the individual print area of the 3D part in accordance with the method according to the invention or not.

The individual coordinate transformation of the 3D part 1a involves at least one of a translation along the z-axis of the coordinate system of the 3D part, a so-called Z-offset, a rotation Rx around the x-axis of the coordinate system of the 3D part, and a rotation Ry around the y-axis of the coordinate system of the respective 3D part. Examples of individual coordinate transformations of the 3D part will be elucidated in relation to FIGS. 5A-5D, 6A-6D, and 7A-7B. In FIGS. 5A-5D, the exemplary coordinate transformation involves a Z-offset only. In FIGS. 6A-6D, the exemplary coordinate transformation involves a Z-offset and a rotation Rx. In FIGS. 7A and 7B, the exemplary coordinate transformation involves a Z-offset, a rotation Rx and a rotation Ry.

Figures 5A, 5B, 5C:
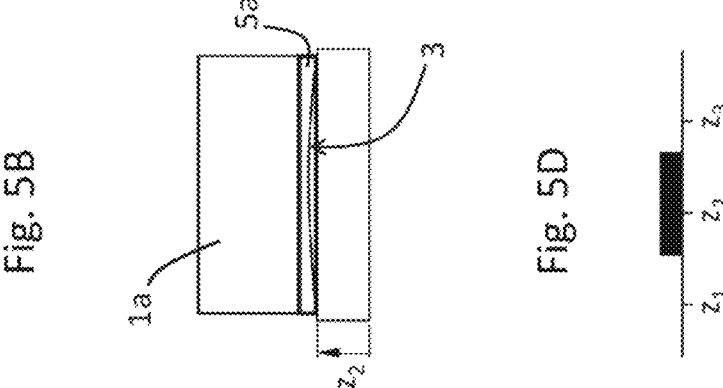
FIGS. 5A-5C show schematic side views of a 3D part in accordance with the fourth exemplary, non-limiting embodiment of the 3D part shown in FIG. 3, wherein for different Z-offsets it is determined whether the first layer of AM feedstock material can successfully be printed on the individual print area of the 3D part in accordance with the method according to the invention or not.
Figure 5D:
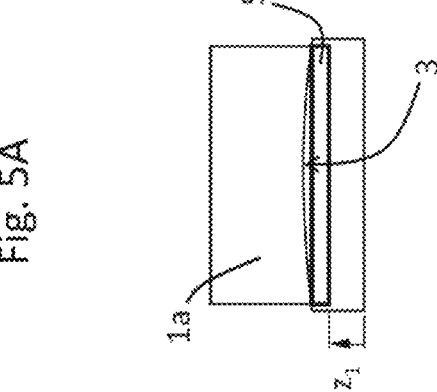
FIG. 5D shows a schematic and non-limiting example of a 1-dimensional solution space for the Z-offset in accordance with which the first layer of AM feedstock material can successfully be printed on the individual print area of the 3D part in accordance with the method according to the invention or not.

Turning to FIGS. 5A-5C, these figures show schematic side views of a 3D part in accordance with the fourth exemplary, non-limiting embodiment of the 3D part 1a shown in FIG. 3, wherein for different Z-offsets, i.e. z1 (FIG. 5A), z2 (FIG. 5B), z3 (FIG. 5C), it is determined whether it is possible to successfully print the first layer 5a of AM feedstock material on the individual print area of the 3D part or not. The first layer 5a of AM feedstock material has only schematically been indicated in order to be able to determine if successful printing would be possible or not. FIG. 5D shows a schematic and non-limiting example of a 1-dimensional solution space for the Z-offset in accordance with which the first layer of AM feedstock material can successfully be printed on the individual print area of the 3D part or not. The black range around Z-offset value z2 defines values for the Z-offset that allow successful printing of the first layer of AM feedstock material on the individual print area of the 3D part. As the values z1 and z3 are outside of the black range, these Z-offset values do not allow $d_{min}$ and $d_{max}$ of the distance distribution for the individual print area to satisfy the condition $t_{min} \leq d_{min} < d_{max} \leq t_{max}$. Consequently, the first layer of AM feedstock material cannot be printed with a thickness distribution that is valid over the entire individual print area, i.e. with thicknesses of the first layer between $t_{min}$ and $t_{max}$.

FIGS. 6A-6C show schematic side views of a 3D part in accordance with the fourth exemplary, non-limiting embodiment of the 3D part 1a shown in FIG. 3, wherein for different Z-offsets and different rotations Rx around the x-axis of the coordinate system of the 3D part it is determined whether the first layer 5a of AM feedstock material can successfully be printed on the individual print area of the 3D part or not. The first layer 5a of AM feedstock material has only schematically been indicated in order to be able to determine if successful printing would be possible or not. FIG. 6D shows a schematic and non-limiting example of a 2-dimensional solution space for the Z-offset and the rotation Rx in accordance with which the first layer of AM feedstock material can successfully be printed on the individual print area of the 3D part or not. The black range indicates the boundaries for combinations of Z-offset values and Rx values that allow successful printing of the first layer of AM feedstock material on the individual print area of the 3D part. Values for combinations of Z-offset and Rx outside of the black range do not allow $d_{min}$ and $d_{max}$ of the distance distribution for the individual print area to satisfy the condition $t_{min} \leq d_{min} < d_{max} \leq t_{max}$. Consequently, the first layer of AM feedstock material cannot be printed with a thickness distribution that is valid over the entire individual print area, i.e. with thicknesses of the first layer between $t_{min}$ and $t_{max}$.

FIG. 7A shows a schematic isometric view of 3D parts 1a, 1b, 1c in accordance with a fifth exemplary, non-limiting embodiment thereof, wherein for different Z-offsets, different rotations Rx and different rotations Ry around the y-axis of the coordinate system of the 3D part it is determined whether the first layer of AM feedstock material can successfully be printed on the individual print area of the 3D part or not. FIG. 7B shows a schematic and non-limiting example of a 3-dimensional solution space for the Z-offset, rotation Rx and rotation Ry in accordance with which the first layer of AM feedstock material can successfully be printed on the individual print area of the 3D part or not. The black range indicates the boundaries for combinations of Z-offset values, Rx values and Ry values that allow successful printing of the first layer of AM feedstock material on the individual print area of the 3D part. Values for combinations of Z-offset, Rx and Ry outside of the black range do not allow $d_{min}$ and $d_{max}$ of the distance distribution for the individual print area to satisfy the condition $t_{min} \leq d_{min} < d_{max} \leq t_{max}$. Consequently, the first layer of AM feedstock material cannot be printed with a thickness distribution that is valid over the entire individual print area, i.e. with thicknesses of the first layer between $t_{min}$ and $t_{max}$.

The person skilled in the art will appreciate that if in none of the above-mentioned 0-, 1-, 2- or 3-dimensional solution spaces a suitable coordinate transformation of the respective 3D part can be determined, the first layer of AM feedstock material cannot be printed on the respective individual print are of the 3D part. Consequently, generating the respective individual set of control instructions for the respective 3D part is cancelled or execution of the individual set of control instructions for the respective 3D part is cancelled. In both cases, printing of the respective 3D part is prevented because the individual print area is not in a suitable condition for allowing reliable printing of at least the first layer of AM feedstock material.

Moreover, the person skilled in the art will appreciate that if a coordinate transformation in any one of the above-mentioned 0-, 1-, 2- or 3-dimensional solution spaces can be selected, upon applying the coordinate transformation to the respective 3D part, the respective individual set of control instructions for the respective 3D part is generated using the determined distance distribution. Consequently, the first layer of AM feedstock material can be printed on the individual print area of the respective 3D part. The person skilled in the art will appreciate that the substantially planar or flat top surface of the first layer of AM feedstock material is not necessarily arranged parallel to the build surface. Depending on the coordinate transformation chosen, the planar or flat top surface of the first layer of AM feedstock material may be skewed with respect to the coordinate system of the build surface.

Figures 8A, 8B:
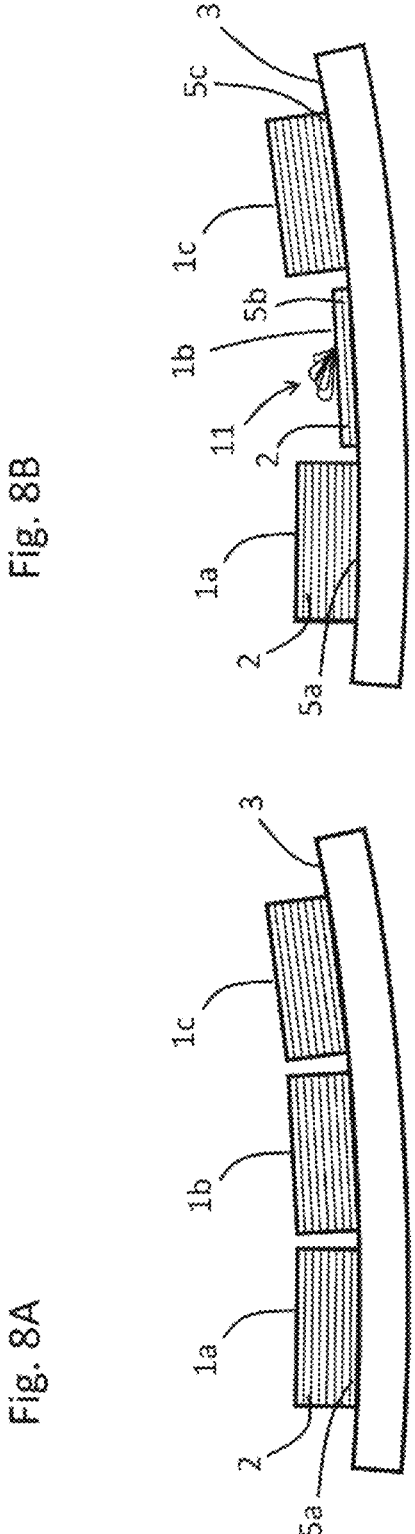
FIG. 8A shows a schematic side view of 3D parts that have successfully been printed on their respective individual print areas on the build surface using the method according to the invention.
FIG. 8B shows a schematic side view of 3D parts that have been printed using the method according to the invention, wherein printing of one of the 3D parts has individually been terminated prematurely due to a printing failure.

FIG. 8A shows a schematic side view of 3D parts 1a, 1b, 1c that have successfully been printed on their respective individual print areas on the build surface 3 using the method according to the invention. The person skilled in the art will appreciate that at least for 3D part 1c a coordinate transformation has been performed in order to allow printing the part on its individual print area provided the topography of the build surface 3 within the individual footprint of the 3D part 1c.

FIG. 8B shows a schematic side view of 3D parts 1a, 1b, 1c that have been printed using the method according to the invention. FIG. 8B shows that printing of 3D part 1b has been terminated prematurely due to a printing failure. Apparently, so-called spaghetti was created after printing the layer 2 of AM feedstock material on top of the first layer 5b of AM feedstock material for 3D part 1b. Detection of this printing-related error caused the individual termination of the printing process with respect to 3D part 1b, whereas the printing process of the other 3D parts 1a and 1c continued and eventually was successfully completed. FIG. 8 illustrates the advantage of the method according to the invention with respect to improving the reliability of extrusion-based additive manufacturing because occurrence of the printing-related error for 3D part 1b only terminated the printing process of 3D part 1b without terminating the printing process of the other 3D parts 1a, 1c within the same print job. Consequently, throughput and production yield of AM 3D printing systems that perform the method according to the invention can be improved. Eventually, the costs of the 3D parts that are obtained using the method according to the invention can be reduced.

Figure 9:
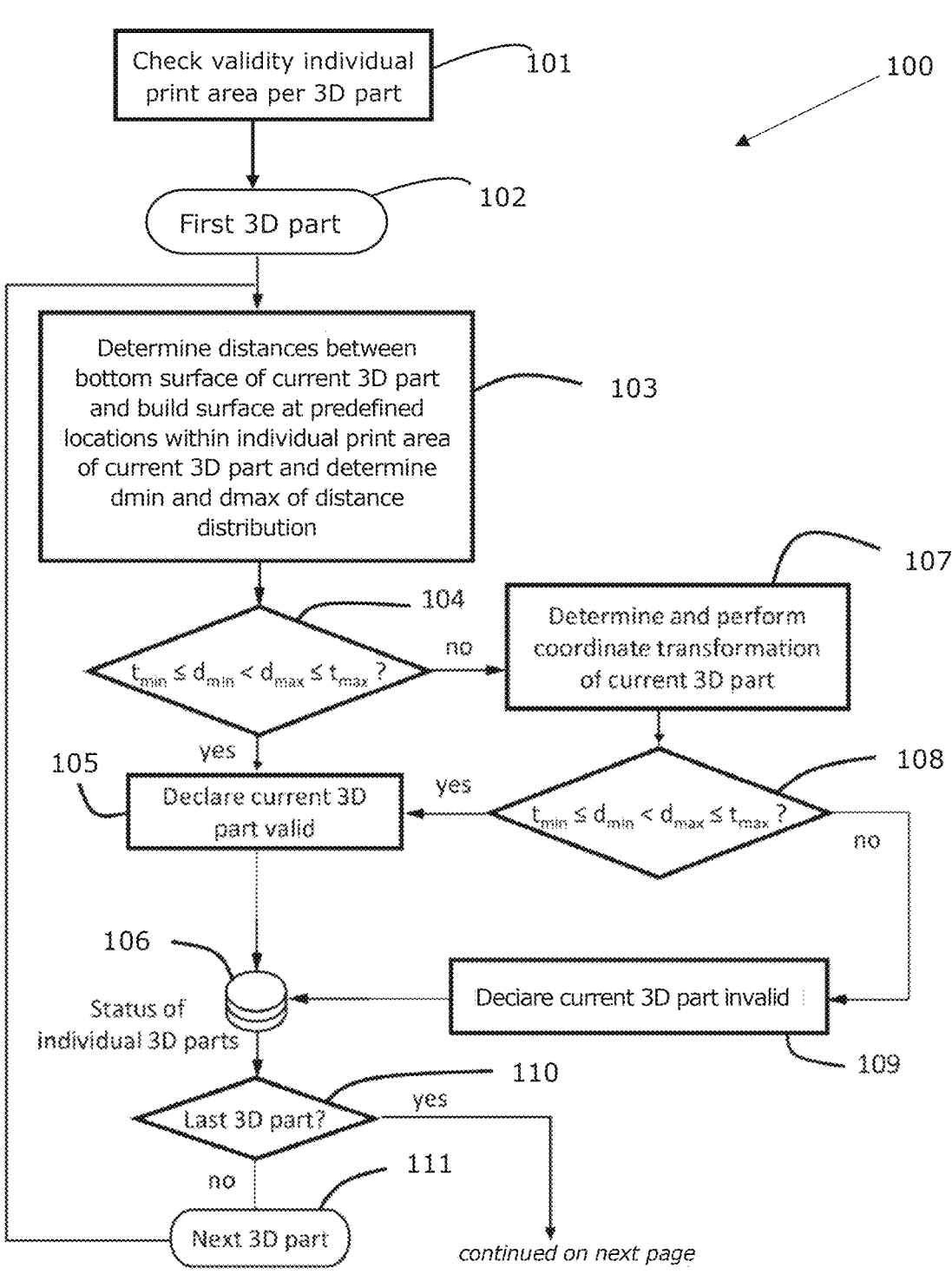
FIG. 9 shows a flow diagram of an exemplary, non-limiting embodiment of the method according to the invention.

FIG. 9 shows a flow diagram 100 of an exemplary, non-limiting embodiment of the method according to the invention. As a first step 101 of the flow diagram 100 the validity of the individual print area of each 3D part in the same print job is checked. Second step 102 of the flow diagram 100 instructs to turn to the first 3D part within the same print job. Third step 103 of the flow diagram 100 instructs to determine the distances between the bottom surface of the current 3D part and the build surface at predefined locations within the individual print area of the current 3D part and to determine the minimum distance, $d_{min}$, and the maximum distance, $d_{max}$, of the distance distribution over the entire individual print area of the current 3D part. In first decision step 104 of the flow diagram 100, it is checked if $d_{min}$ and $d_{max}$ of the distance distribution satisfy the condition $t_{min} \leq d_{min} < d_{max} \leq t_{max}$. If this condition is met, the first layer of AM feedstock material can be printed on the individual print area of the current 3D part and the status of the current 3D part is declared valid in fourth step 105 and stored as such in a storage in fifth step 106 of the flow diagram 100. If this condition is not met, sixth step 107 of the flow diagram instructs to determine and perform a coordinate transformation of the current 3D part. The person skilled in the art will appreciate that any one of the above-mentioned coordinate transformations can be considered. In the second decision step 108 of the flow diagram 100, it is checked if after the coordinate transformation of the current 3D part, $d_{min}$ and $d_{max}$ of the distance distribution satisfy the condition $t_{min} \leq d_{min} < d_{max} \leq t_{max}$. If this condition upon performing the coordinate transformation is now met, the first layer of AM feedstock material can be printed on the individual print area of the current 3D part and the status of the current 3D part is declared valid in fourth step 105 and stored as such in the storage in fifth step 106 of the flow diagram 100. However, if this condition can still not be met, it is concluded that the first layer of AM feedstock material cannot be printed on the individual print area of the current 3D part and the status of the current 3D part is declared invalid in seventh step 109 and stored as such in the storage in fifth step 106 of the flow diagram 100. In the third decision step 110 of the flow diagram 100, it is checked if the current 3D part is the last 3D part in the print job. As in the context of the method of the present invention, the print job comprises at least two 3D parts, the answer to this check if of course negative. Eighth step 111 of the flow diagram

100 instructs to turn to the next 3D part in the same print job and the same assessment as to the validity of the individual print area of the next 3D part is undertaken. Upon reaching the last 3D part of the same print job, the initial status of each of the individual 3D parts, i.e. valid or invalid, has been stored in the storage in fifth step 106 of the flow diagram 100.

Ninth step 112 of the flow diagram 100 instructs to turn to the first layer of AM feedstock material to be printed. Tenth step 113 of the flow diagram 100 instructs to turn to the first 3D part of the same print job. Eleventh step 114 of the flow diagram 100 instructs to retrieve the status information of the current, i.e. first 3D part as stored in the storage in the fifth step 106 of the flow diagram. In the fourth decision step 115 of the flow diagram 100 it is checked if the current status of the current 3D part is valid. If this is the case, twelfth step 116 of the flow diagram 100 instructs to print the current, i.e. first layer of feedstock material of the current, i.e. first 3D part on its individual print area on the build surface. If the retrieved status of the current, i.e. first 3D part is invalid, the current layer, i.e. first layer of feedstock material is not being printed. The printing of the 3D part as a whole is individually cancelled.

In the fifth decision step 117 of the flow diagram 100 it is checked if printing-related errors occur during printing of the current, i.e. first layer of feedstock material. If printing-related errors have been detected, thirteenth step 118 of the flow diagram 100 instructs to declare the current, i.e. first 3D part invalid. In fourteenth step 119 of the flow diagram 100, the invalid status of the current 3D part that has been declared in thirteenth step 118 of the flow diagram 100 is stored as such in the storage. As a result of storing the invalid status of the current 3D part, the printing of any further layers of feedstock material is prevented as the outcome of the fourth decision step 115 will be negative for all further layers of this 3D part. In this way, the printing of this 3D part has individually been terminated. If no printing-related errors have been detected, in sixth decision step 120 it is checked if the current 3D part is the last 3D part in the same print job. As mentioned above, as in the context of the present invention the same print job comprises at least two 3D parts, the answer after the first 3D part will be negative. Fifteenth step 121 instructs to turn to the next 3D part in the same print job and the same assessment as described above in relation to steps 114-120 will be undertaken in respect of the first layer of the next, i.e. second 3D part in the same print job. Upon reaching the last 3D part of the same print job, it is checked in seventh decision step 122 of the flow diagram 100 if the current layer, i.e. the first layer, is the last layer of feedstock material that is to be deposited. If the answer is negative, sixteenth step 123 of the flow diagram 100 instructs to turn to the next layer and the same assessment as described above in relation to steps 113-122 will be undertaken in respect of the next, i.e. second layer of feedstock material starting with the first 3D part of the at least two 3D parts in the same print job. Upon reaching the last layer of the last 3D part in the same print job, the answer to the check in the seventh decision step 122 of the flow diagram 100 will be affirmative. Final step 124 of the flow diagram 100 instructs that the method according to the above-described exemplary embodiment ends.

The person skilled in the art will appreciate that several scenarios can occur regarding printing of the 3D parts in the same print job. If all 3D parts have a valid status, at least their respective first layers of feedstock material can be printed on their respective individual print areas. It is also possible that depending on a predefined threshold for the number of 3D parts for which printing is prevented because of their invalid status, the 3D printing system can be configured to generate a service alert indicating that the build surface needs to be re-aligned or needs to be exchanged. The 3D printing system can be configured to send a warning alert that the above-mentioned predefined threshold is soon to be reached. In this way, operators can already anticipate the service alert and take appropriate measures such as for example ordering of a new build surface. The predefined threshold can be chosen to reject printing of all 3D parts if at least one of them has an invalid status. However, the predefined threshold can also be chosen such that if only a few of the 3D parts in the same print job have an invalid status and most of the 3D parts have a valid status, at least the first layers of feedstock material of the 3D parts having the valid status can be printed on their respective individual print areas.

Figure 10:
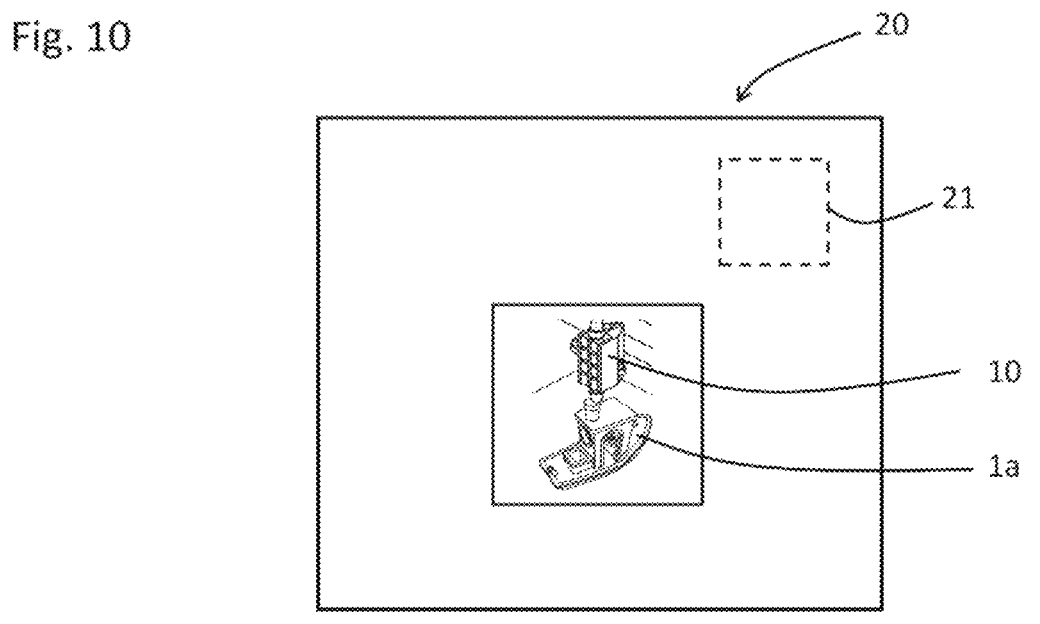

FIG. 10 shows a schematic representation of a 3D printing system 20 according to the present invention. The 3D printing system 20 comprises a processing unit 21 that is adapted to print a 3D part 1a using the method according to the invention. The person skilled in the art will appreciate that the processing unit 21 of the 3D printing system 20 is operatively connected with all relevant parts of the 3D printing system 20 that are required to print the 3D part 1a using an extrusion-based additive manufacturing process.

The present invention can be summarized as relating to a method for enabling an extrusion-based AM 3D printing system to handle individual 3D parts of a print job comprising multiple 3D parts instead of handling the print job as a whole. The method comprises slicing the print job to generate a set of slices for the digital 3D representations of the 3D parts. Each slice comprising geometrical data defining boundaries of a layer of AM feedstock material for printing each 3D part taking into account said boundaries. Generating for each 3D part an individual set of geometrical data taking into account said geometrical data, wherein each individual set of geometrical data comprises geometrical data defining the boundaries of the layers of AM feedstock material that are to be taken into account for printing the respective 3D part. The invention also relates to an AM 3D printing system that is adapted to perform said method.

The method and system of the present disclosure allow to make decisions based on run time data, including data relating to the respective printer, that was not available at the time of slicing. At the time of slicing object data, it may not (yet) be known to which printer the data will be sent for printing. As certain printer specific parameters may differ from printer to printer, there is an inherent inaccuracy. The method and system of the disclosure obviate these problems. This improves accuracy and limits losses. Sliced object data may be adapted to parameters relating to the respective printer or printing system, for instance one of more of the following parameters:

1. The flatness of the print bed or build surface. The flatness of the print bed can vary between printers and even from print job to print job as the flatness of the print bed may change over time. This is not known during slicing of object data, since usually it is not known to the slicer on which printer a print job will be printed.

2. Topography of the print bed or build surface. The individual coordinate transformation of each respective 3D part may be adapted to the in-situ print bed topography. Said topography is typically not known at the time of slicing, and may vary from printer to printer, and may change over time. As described above, the coordinate translation may include one or more of location, z-offset, and rotation.

3. (Non-)orthogonality of the print bed of the AM 3D printing system. I.e., the print bed may be (slightly) tilted along the x-axis and/or the y-axis. The method and system of the disclosure allow to compensate tilt of the print bed with a coordinate transformation per 3D part.

4. Unforeseen errors during printing. The method of the disclosure allows loss of individual parts due to unforeseen errors during printing, while continuing with other parts. Errors are also not known at the time of slicing.

Generally, there are basically two ways for the printer to distinguish the at least two individual parts in the print job:

1. (the easiest way) by adding additional control instructions certifying which instructions belong to which printed object; or 2. (a potential workaround) by simulating the build of the print job in the printer, and then reconstructing which bodies do not touch during printing, meaning these eventually will become the individual parts.

The method and system of the disclosure are suitable for both methods. An advantage of the second method is that it could potentially also work with files generated by a third party slicer which thus does not generate additional instructions.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS 1a, 1b, 1c 3D part
2 layers of AM feedstock material
3 build surface
4a, 4b, 4c individual footprint of 3D part in context of invention
5a, 5b, 5c first layer of AM feedstock material
6 bottom surface 3D part
7 footprint relevant for placement part on build surface
8 coordinate system 3D part
9 coordinate system build surface
10 printing head
11 printing-related error: "spaghetti"
20 3D printing system 21 processing unit
$d_{min}$ minimum distance of distance distribution
$d_{max}$ maximum distance of distance distribution
$t_{min}$ minimum thickness first layer of feedstock material
$t_{max}$ maximum thickness first layer of feedstock material
100 flow diagram
101 first step of flow diagram
102 second step of flow diagram
103 third step of flow diagram
104 first decision step of flow diagram
105 fourth step of flow diagram
106 fifth step of flow diagram
107 sixth step of flow diagram
108 second decision step of flow diagram
109 seventh step of flow diagram
110 third decision step of flow diagram
111 eighth step of flow diagram
112 ninth step of flow diagram
113 tenth step of flow diagram
114 eleventh step of flow diagram
115 fourth decision step of flow diagram
116 twelfth step of flow diagram
117 fifth decision step of flow diagram
118 thirteenth step of flow diagram
119 fourteenth step of flow diagram
120 sixth decision step of flow diagram
121 fifteenth step of flow diagram
122 seventh decision step of flow diagram
123 sixteenth step of flow diagram
124 final step of flow diagram

What is claimed is:

1. A method for enabling an extrusion-based additive manufacturing (AM) three-dimensional (3D) printing system to handle individual 3D parts of a print job comprising at least two 3D parts, the method comprising the steps of:

providing the print job that provides digital 3D representations of the at least two 3D parts;

slicing the print job to generate a set of slices for the digital 3D representations of the at least two 3D parts, each slice of the set of slices comprising geometrical data defining respective boundaries of a respective layer of AM feedstock material that is to be deposited from a nozzle of a printing head on one of a build surface and a previously deposited layer of AM feedstock material to print each 3D part taking into account said respective boundaries;

generating for each 3D part a respective individual set of geometrical data taking into account said geometrical data provided by each slice of the set of slices, wherein each individual set of geometrical data comprises geometrical data defining the respective boundaries of the respective layers of AM feedstock material that are to be taken into account for printing the respective 3D part;

sending the sliced print job to an AM 3D printing system;

optimizing the print procedure for the respective AM 3D printing system for each 3D part individually by generating for each 3D part the respective individual set of geometrical data taking into account said geometrical data provided by each slice of the set of slices and taking into account parameters of the respective AM 3D printing system; and generating an individual set of control instructions for each 3D part based on the individual set of geometrical data.

2. The method according to claim 1, comprising the steps of adapting sliced object data to parameters relating to an AM 3D printing system based on decisions made based on run time data, including data relating to the respective printer, that was not available at the time of slicing.

3. The method according to claim 1, wherein generating for each 3D part a respective individual set of geometrical data taking into account said geometrical data provided by each slice of the set of slices comprises:

providing the geometrical data provided by each slice of the set of slices with custom commands to group for each 3D part the respective geometrical data defining the respective boundaries of the respective layers of AM feedstock material that are to be deposited, thereby generating for each 3D part the respective individual set of geometrical data.

4. The method according to claim 1, wherein generating for each 3D part a respective individual set of geometrical data taking into account said geometrical data provided by each slice of the set of slices comprises:

reconstructing each volume that is to be printed by taking into account the geometrical data provided by each slice of the set of slices and a predefined standard layer thickness with which the respective layers of AM feedstock material are to be deposited;

identifying 3D parts by comparing each reconstructed volume with each volume of each 3D part as defined by the respective digital 3D representations of the respective 3D parts; and grouping for each slice of the set of slices the respective geometrical data for each identified 3D part, thereby generating for each 3D part the respective individual set of geometrical data.

5. The method according to claim 1, comprising:

determining for each 3D part a respective individual footprint based on the respective geometrical data for a respective first layer of AM feedstock material that is to be deposited in direct contact with the build surface provided by the respective individual set of geometrical data for the respective 3D part, each respective individual footprint being an area that is enclosed by respective boundaries of the respective first layer of AM feedstock material;

generating an individual set of control instructions for each 3D part by taking into account the respective individual set of geometrical data for the respective 3D part, wherein each individual set of control instructions enables the AM 3D system to individually control fabrication of each 3D part; and printing each 3D part on a respective individual print area of the build surface taking into account the respective individual set of control instructions for the respective 3D part, wherein the respective individual print area is equal to the respective individual footprint of the respective 3D part.

6. The method according to claim 5, wherein printing each 3D part on a respective individual print area of the build surface taking into account the respective individual set of control instructions for the respective 3D part further comprises:

detecting an error associated with at least one deposited layer of AM feedstock material of a respective 3D part of the at least two 3D parts, and labelling the respective 3D part as a rejected 3D part;

individually terminating printing of the rejected 3D part while continuing printing non-rejected 3D parts of the at least two 3D parts until all layers of AM feedstock have been deposited for the respective non-rejected 3D part or all 3D parts have been rejected.

7. The method according to claim 6, wherein for each individually rejected 3D part a respective waiting time is generated that has a duration that is equal to a respective deposition time that would have been required for depositing the respective next layer of AM feedstock material for the respective individually rejected 3D part, wherein the respective waiting time for each individually rejected 3D part is taken into account when depositing the respective next layer of AM feedstock material for each respective non-rejected 3D part of the at least two 3D parts to maintain validity of a thermal simulation result that has been obtained by performing a thermal simulation taking into account the respective individual set of control instructions for each 3D part prior to starting printing each 3D part on a respective individual print area of the build surface.

8. The method according to claim 5, wherein printing each 3D part on a respective individual print area of the build surface taking into account the respective individual set of control instructions for the respective 3D part further comprises:

depositing the respective first layer of AM feedstock material in contact with the build surface of the respective individual print area of the respective 3D part and depositing respective next layers of AM feedstock material on top of each other starting from the respective first layer, the respective next layers of AM feedstock material having identical characteristics whereas the respective first layer of AM feedstock material has at least one characteristic that distinguishes the respective first layer from the respective next layers thereby enabling, after printing of the respective 3D part has been terminated, an improved removability of the respective first layer from the respective next layers of AM feedstock material without causing delamination of the respective next layers from each other.

9. The method according to claim 1, wherein generating the individual set of control instructions for each 3D part comprises:

transforming a coordinate system of the respective 3D part to align a bottom surface of the respective 3D part with the build surface of the 3D printing system;

determining distances between the bottom surface of the respective 3D part and the build surface at predefined locations across the respective individual print area onto which the respective 3D part is to be printed for determining a distance distribution over the entire respective individual print area;

determining a minimum distance, $d_{min}$, and a maximum distance, $d_{max}$, of the determined distance distribution;

generating the respective individual set of control instructions for the respective 3D part using the determined distance distribution if $d_{min}$ and $d_{max}$ satisfy a condition $t_{min} \leq d_{min} < d_{max} \leq t_{max}$, wherein $t_{min}$ is a predefined minimum thickness and $t_{max}$ is a predefined maximum thickness of the respective first layer of AM feedstock material, wherein after having been deposited, the respective first layer of AM feedstock material provides a substantially planar top surface on which a next layer of AM feedstock material is printable.

10. The method according to claim 9, wherein the individual set of control instructions for the respective 3D part is generated after performing an individual coordinate transformation of the respective 3D part in order to allow $d_{min}$ and $d_{max}$ to satisfy the condition $t_{min} \leq d_{min} < d_{max} \leq t_{max}$.

11. The method according to claim 10, wherein the individual coordinate transformation of the respective 3D part involves at least one of:

translation along the z-axis of the coordinate system of the respective 3D part;

rotation Rx around the x-axis of the coordinate system of the respective 3D part; and rotation Ry around the y-axis of the coordinate system of the respective 3D part.

12. The method according to claim 11, wherein determining the individual coordinate transformation for the respective 3D part further comprises taking into account a determined non-straightness of at least one of an x-axis arrangement, a y-axis arrangement and a z-axis arrangement of the AM 3D printing system.

13. The method according to claim 9, wherein the distances between the bottom surface of the respective 3D part and the build surface at predefined locations across the respective individual print area are determined using results obtained by at least one of a contactless measurement technique and a measurement technique that involves a physical contact between the build surface and at least one of:

a probing arrangement that is associated with the printing head; and the nozzle of the printing head.

14. The method according to claim 9, wherein the predefined minimum thickness, $t_{min}$, of the respective first layer of AM feedstock material is equal to 50% of a predefined standard layer thickness with which respective other layers of AM feedstock material than the respective first layer of AM feedstock material are to be deposited, and the predefined maximum thickness, $t_{max}$, of the respective first layer of AM feedstock material is equal to 150% of said predefined standard layer thickness.

15. The method according to claim 9, wherein prior to printing each 3D part on a respective individual print area of the build surface, a respective 3D part of the at least two 3D parts is individually rejected upon determining that no respective individual set of control instructions has been generated for the respective 3D part thereby avoiding starting printing of the respective 3D part on the respective individual print area.

16. The method of claim 1, including the steps of:

the AM 3D printing system distinguishing the at least two individual 3D parts in the print job; and at least one of the step of slicing the print job to generate a set of slices for the digital 3D representations of the at least two 3D parts including adding additional control instructions certifying which instructions belong to which 3D part; or simulating the build of the print job in the AM 3D printing system, and then reconstructing which bodies do not touch during printing, meaning these eventually will become the individual 3D parts.

17. An extrusion-based additive manufacturing (AM) three-dimensional (3D) printing system that is adapted to handle individual 3D parts of a print job comprising at least two 3D parts, the extrusion-based AM 3D printing system comprising a processing unit that is provided with computer instructions which when executed in the processing unit enable the extrusion-based AM 3D printing system to perform the method according to claim 1.

18. The method according to claim 1, comprising the steps of adapting sliced object data to parameters relating to an AM 3D printing system and making decisions based on run time data, including data relating to the respective printer, that was not available at the time of slicing;

wherein generating for each 3D part a respective individual set of geometrical data taking into account said geometrical data provided by each slice of the set of slices comprises:

providing the geometrical data provided by each slice of the set of slices with custom commands to group for each 3D part the respective geometrical data defining the respective boundaries of the respective layers of AM feedstock material that are to be deposited, thereby generating for each 3D part the respective individual set of geometrical data;

wherein generating for each 3D part a respective individual set of geometrical data taking into account said geometrical data provided by each slice of the set of slices comprises:

reconstructing each volume that is to be printed by taking into account the geometrical data provided by each slice of the set of slices and a predefined standard layer thickness with which the respective layers of AM feedstock material are to be deposited;

identifying 3D parts by comparing each reconstructed volume with each volume of each 3D part as defined by the respective digital 3D representations of the respective 3D parts; and grouping for each slice of the set of slices the respective geometrical data for each identified 3D part, thereby generating for each 3D part the respective individual set of geometrical data;

additionally comprising the steps of:

determining for each 3D part a respective individual footprint based on the respective geometrical data for a respective first layer of AM feedstock material that is to be deposited in direct contact with the build surface provided by the respective individual set of geometrical data for the respective 3D part, each respective individual footprint being an area that is enclosed by respective boundaries of the respective first layer of AM feedstock material;

generating an individual set of control instructions for each 3D part by taking into account the respective individual set of geometrical data for the respective 3D part, wherein each individual set of control instructions enables the AM 3D system to individually control fabrication of each 3D part; and printing each 3D part on a respective individual print area of the build surface taking into account the respective individual set of control instructions for the respective 3D part, wherein the respective individual print area is equal to the respective individual footprint of the respective 3D part; and wherein generating the individual set of control instructions for each 3D part comprises:

transforming a coordinate system of the respective 3D part to align a bottom surface of the respective 3D part with the build surface of the 3D printing system;

determining distances between the bottom surface of the respective 3D part and the build surface at predefined locations across the respective individual print area onto which the respective 3D part is to be printed for determining a distance distribution over the entire respective individual print area;

determining a minimum distance, $d_{min}$, and a maximum distance, $d_{max}$, of the determined distance distribution; and generating the respective individual set of control instructions for the respective 3D part using the determined distance distribution if $d_{min}$ and $d_{max}$ satisfy a condition $t_{min} \leq d_{min} < d_{max} \leq t_{max}$, wherein $t_{min}$ is a predefined minimum thickness and $t_{max}$ is a predefined maximum thickness of the respective first layer of AM feedstock material, wherein after having been deposited, the respective first layer of AM feedstock material provides a substantially planar top surface on which a next layer of AM feedstock material is printable.

19. The method according to claim 18, wherein the individual set of control instructions for the respective 3D part is generated after performing an individual coordinate transformation of the respective 3D part in order to allow $d_{min}$ and $d_{max}$ to satisfy the condition $t_{min} \leq d_{min} < d_{max} \leq t_{max}$;

wherein the individual coordinate transformation of the respective 3D part involves at least one of:

translation along the z-axis of the coordinate system of the respective 3D part;

rotation Rx around the x-axis of the coordinate system of the respective 3D part; and rotation Ry around the y-axis of the coordinate system of the respective 3D part;

wherein determining the individual coordinate transformation for the respective 3D part further comprises taking into account a determined non-straightness of at least one of an x-axis arrangement, a y-axis arrangement and a z-axis arrangement of the AM 3D printing system;

wherein the distances between the bottom surface of the respective 3D part and the build surface at predefined locations across the respective individual print area are determined using results obtained by at least one of a contactless measurement technique and a measurement technique that involves a physical contact between the build surface and at least one of:

a probing arrangement that is associated with the printing head; and the nozzle of the printing head;

wherein the predefined minimum thickness, $t_{min}$, of the respective first layer of AM feedstock material is equal to 50% of a predefined standard layer thickness with which respective other layers of AM feedstock material than the respective first layer of AM feedstock material are to be deposited, and the predefined maximum thickness, $t_{max}$, of the respective first layer of AM feedstock material is equal to 150% of said predefined standard layer thickness;

wherein prior to printing each 3D part on a respective individual print area of the build surface, a respective 3D part of the at least two 3D parts is individually rejected upon determining that no respective individual set of control instructions has been generated for the respective 3D part thereby avoiding starting printing of the respective 3D part on the respective individual print area;

wherein printing each 3D part on a respective individual print area of the build surface taking into account the respective individual set of control instructions for the respective 3D part further comprises:

detecting an error associated with at least one deposited layer of AM feedstock material of a respective 3D part of the at least two 3D parts, and labelling the respective 3D part as a rejected 3D part;

individually terminating printing of the rejected 3D part while continuing printing non-rejected 3D parts of the at least two 3D parts until all layers of AM feedstock have been deposited for the respective non-rejected 3D part or all 3D parts have been rejected;

wherein for each individually rejected 3D part a respective waiting time is generated that has a duration that is equal to a respective deposition time that would have been required for depositing the respective next layer of AM feedstock material for the respective individually rejected 3D part, wherein the respective waiting time for each individually rejected 3D part is taken into account when depositing the respective next layer of AM feedstock material for each respective non-rejected 3D part of the at least two 3D parts to maintain validity of a thermal simulation result that has been obtained by performing a thermal simulation taking into account the respective individual set of control instructions for each 3D part prior to starting printing each 3D part on a respective individual print area of the build surface; and wherein printing each 3D part on a respective individual print area of the build surface taking into account the respective individual set of control instructions for the respective 3D part further comprises:

depositing the respective first layer of AM feedstock material in contact with the build surface of the respective individual print area of the respective 3D part and depositing respective next layers of AM feedstock material on top of each other starting from the respective first layer, the respective next layers of AM feedstock material having identical characteristics whereas the respective first layer of AM feedstock material has at least one characteristic that distinguishes the respective first layer from the respective next layers thereby enabling, after printing of the respective 3D part has been terminated, an improved removability of the respective first layer from the respective next layers of AM feedstock material without causing delamination of the respective next layers from each other.

20. A method for enabling an extrusion-based additive manufacturing (AM) three-dimensional (3D) printing system to handle individual 3D parts of a print job comprising at least two 3D parts, the method comprising the steps of:

providing the print job that provides digital 3D representations of the at least two 3D parts;

slicing the print job to generate a set of slices for the digital 3D representations of the at least two 3D parts, each slice of the set of slices comprising geometrical data defining respective boundaries of a respective layer of AM feedstock material that is to be deposited from a nozzle of a printing head on one of a build surface and a previously deposited layer of AM feedstock material to print each 3D part taking into account said respective boundaries;

generating for each 3D part a respective individual set of geometrical data taking into account said geometrical data provided by each slice of the set of slices, wherein each individual set of geometrical data comprises geometrical data defining the respective boundaries of the respective layers of AM feedstock material that are to be taken into account for printing the respective 3D part; and adapting sliced object data to parameters relating to an AM 3D printing system based on decisions made based on run time data, including data relating to the respective printer, that was not available at the time of slicing.

\* \* \* \* \*